United States Patent
Satoyama et al.

(10) Patent No.: US 10,747,624 B2
(45) Date of Patent: Aug. 18, 2020

(54) STORAGE SYSTEM AND CONTROL METHOD OF STORAGE SYSTEM USING ASYNCHRONOUS REMOTE COPYING TO BACKUP VOLUME AT SPECIFIC TIME POINTS

(71) Applicant: HITACHI, LTD., Tokyo (JP)

(72) Inventors: Ai Satoyama, Tokyo (JP); Tomohiro Kawaguchi, Tokyo (JP); Hiroshi Nasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 283 days.

(21) Appl. No.: 15/751,052

(22) PCT Filed: Oct. 14, 2015

(86) PCT No.: PCT/JP2015/079051
§ 371 (c)(1),
(2) Date: Feb. 7, 2018

(87) PCT Pub. No.: WO2017/064770
PCT Pub. Date: Apr. 20, 2017

(65) Prior Publication Data
US 2018/0232286 A1    Aug. 16, 2018

(51) Int. Cl.
*G06F 11/14*    (2006.01)
*G06F 16/27*    (2019.01)
*G06F 11/20*    (2006.01)

(52) U.S. Cl.
CPC ...... *G06F 11/1458* (2013.01); *G06F 11/2064* (2013.01); *G06F 11/2074* (2013.01);
(Continued)

(58) Field of Classification Search
CPC .. G06F 11/1458; G06F 16/273; G06F 16/275; G06F 11/2064; G06F 11/2074; G06F 11/1453
(Continued)

(56) References Cited

U.S. PATENT DOCUMENTS 7,945,534 B1 * 5/2011 Oliveira ............. G06F 11/1471
707/638
9,367,457 B1 * 6/2016 Pendharkar ......... G06F 12/0815
(Continued)

FOREIGN PATENT DOCUMENTS

| JP | 2008-171387 A | 7/2008 |
| JP | 2008-209966 A | 9/2008 |
| JP | 2011-530748 A | 12/2011 |

OTHER PUBLICATIONS

International Search Report for WO 2017/064770 A1, dated Jan. 19, 2016.

*Primary Examiner* — Hares Jami
(74) *Attorney, Agent, or Firm* — Volpe and Koenig, P.C.

(57) ABSTRACT

In order to create, at another site, a backup of a volume at a specific time point while minimizing the response time required to update the volume, a first storage apparatus and a second storage apparatus transfer a journal in a first journal volume to the second storage apparatus, the second storage apparatus writes the transferred journal into a second journal volume, the second storage apparatus reads journals in the second journal volume in order of the update, the second storage apparatus reflects the read journals to a second data volume, the first storage apparatus creates, in the first journal volume, a journal including a marker when a specific condition is satisfied, and the second storage apparatus creates a snapshot of the second data volume upon detecting a marker in the read journal.

8 Claims, 25 Drawing Sheets

(52) U.S. Cl.
CPC .......... *G06F 16/273* (2019.01); *G06F 16/275*
(2019.01); *G06F 11/1453* (2013.01); *G06F 2201/84* (2013.01); *G06F 2201/855* (2013.01)

(58) Field of Classification Search
USPC ................................................ 707/609–686
See application file for complete search history.

(56) References Cited

U.S. PATENT DOCUMENTS

| | | |
|---|---|---|
| 2005/0033827 A1 | 2/2005 | Yamagami |
| 2007/0106855 A1* | 5/2007 | Hosouchi ............ G06F 11/2074 711/162 |
| 2008/0168218 A1 | 7/2008 | Arakawa et al. |
| 2008/0209146 A1 | 7/2008 | Imazu et al. |
| 2009/0271582 A1 | 10/2009 | Ninose |

* cited by examiner

Remote copy pair volume management information

Snapshot pair volume management information

FIG.6

| | | | |
|---|---|---|---|
| 511 — Consistency group ID | | | |
| 512 — Pair state | | | |
| 530 — Latest sequence number | | | |
| 540 — Untransferred sequence number | | | |
| 550 — Formalized sequence number | | | |
| 560 — Pair volume information | Pair volume 1 | Pair volume management information | — 301 |
| | ... | ... | — 571 |
| 570 — P journal volume information | Storage apparatus ID | | |
| | P journal volume 1 | Journal volume management information | — 401 |
| | ... | ... | — 581 |
| 580 — S journal volume information | Storage apparatus ID | | |
| | S journal volume 1 | Journal volume management information | — 401 |
| | ... | ... | |

Consistency group management information

Remote copy data

Journal volume management information

Data volume management information

Journal metadata

STORAGE SYSTEM AND CONTROL METHOD OF STORAGE SYSTEM USING ASYNCHRONOUS REMOTE COPYING TO BACKUP VOLUME AT SPECIFIC TIME POINTS

TECHNICAL FIELD

The present invention relates to a storage system.

BACKGROUND ART

Methods of backing up a storage apparatus include creating a duplicate in an enclosure of the storage apparatus, and backing up the duplicate in a tape apparatus located outside of the storage apparatus. With the former method involving creating a duplicate in the enclosure of the storage apparatus, restoring operations is difficult when a fault occurs in the enclosure.

In addition, remote copy functions are known which involve, in preparation of data loss in the event of a disaster such as an earthquake or fire, a plurality of storage apparatuses respectively arranged at a plurality of sites multiplexing data and storing the multiplexed data.

Remote copy functions can be roughly divided into two, namely, "synchronous remote copy" in which a storage apparatus transfers data to a copy destination storage apparatus in synchronization with a write command from a host computer, and "asynchronous remote copy" in which the storage apparatus transfers data to the copy destination storage apparatus after a completion response to the write command from the host computer.

Whichever remote copy function is used, when a disaster strikes at a primary site, operations of both the host computer and the storage apparatus are switched to a secondary site. Accordingly, data loss and suspension of operations can be minimized even when a disaster strikes at a site. In addition, recently, there is much attention on implementations aimed at avoiding a disaster when the disaster can be predicted as in the case of a typhoon or a tsunami by switching operations to a secondary site before the disaster strikes in order to prevent data loss and suspension of operations in advance.

Furthermore, since synchronous remote copy has an advantage in that data of a copy source and data of a copy destination are constantly synchronized but a response to write by a host computer disadvantageously takes time, asynchronous remote copy is generally used between sites separated by large distances.

PTL 1 discloses a technique for performing asynchronous remote copy using a journal. Upon receiving a write command, a copy source storage apparatus at a primary site writes data into a data write volume, writes journal data into a journal volume, and returns a response to a host computer. A copy destination storage apparatus at a secondary site reads journal data from the journal volume of the copy source storage apparatus asynchronously with the write command and stores the journal data in its own journal volume. In addition, the copy destination storage apparatus reflects data on a copy destination data write volume based on the stored journal data.

In addition, in PTL 2, synchronous remote copy is performed between a copy source volume of a primary site and a copy destination volume of a secondary site to duplex data. With the disclosed technique, by providing a host computer with both the copy source volume and the copy destination volume as volumes having a same identifier, accepting access at the primary site during normal operations and switching access to the secondary site upon occurrence of a fault enables the secondary site to be used transparently with respect to the host and operations to be continued without any suspension.

CITATION LIST

Patent Literature

[PTL 1]
U.S. Patent Application Publication No. 2005/0033827 (Specification)
[PTL 2]
U.S. Patent Application Publication No. 2009/0271582 (Specification)

SUMMARY OF INVENTION

Technical Problem

In asynchronous remote copy, since data written to a primary site is asynchronously copied to a secondary site, it is difficult to create, in the secondary site, a backup of the primary site at a specific time point.

Solution to Problem

In order to solve the problem described above, a storage system according to an aspect of the present invention includes a first storage apparatus coupled to a host computer, and a second storage apparatus coupled to the first storage apparatus. The first storage apparatus is configured to create a first data volume and a first journal volume in the first storage apparatus, the first storage apparatus is configured to provide the host computer with the first data volume, the second storage apparatus is configured to create a second data volume and a second journal volume in the second storage apparatus, the first storage apparatus is configured to create, in accordance with an update of the first data volume, a journal indicating the update in the first journal volume, the first storage apparatus and the second storage apparatus are configured to transfer the journal in the first journal volume to the second storage apparatus, the second storage apparatus is configured to write the transferred journal into the second journal volume, the second storage apparatus is configured to read journals in the second journal volume in order of the update, the second storage apparatus is configured to reflect the read journals to the second data volume, the first storage apparatus is configured to create, in the first journal volume, a journal including a marker when a specific condition is satisfied, and the second storage apparatus is configured to create a snapshot of the second data volume upon detecting a marker in the read journal.

Advantageous Effects of Invention

A backup of a volume at a specific time point can be created at another site while minimizing the response time required to update the volume.

BRIEF DESCRIPTION OF DRAWINGS

FIG. 6 shows consistency group management information.

DESCRIPTION OF EMBODIMENTS

Figure 1:
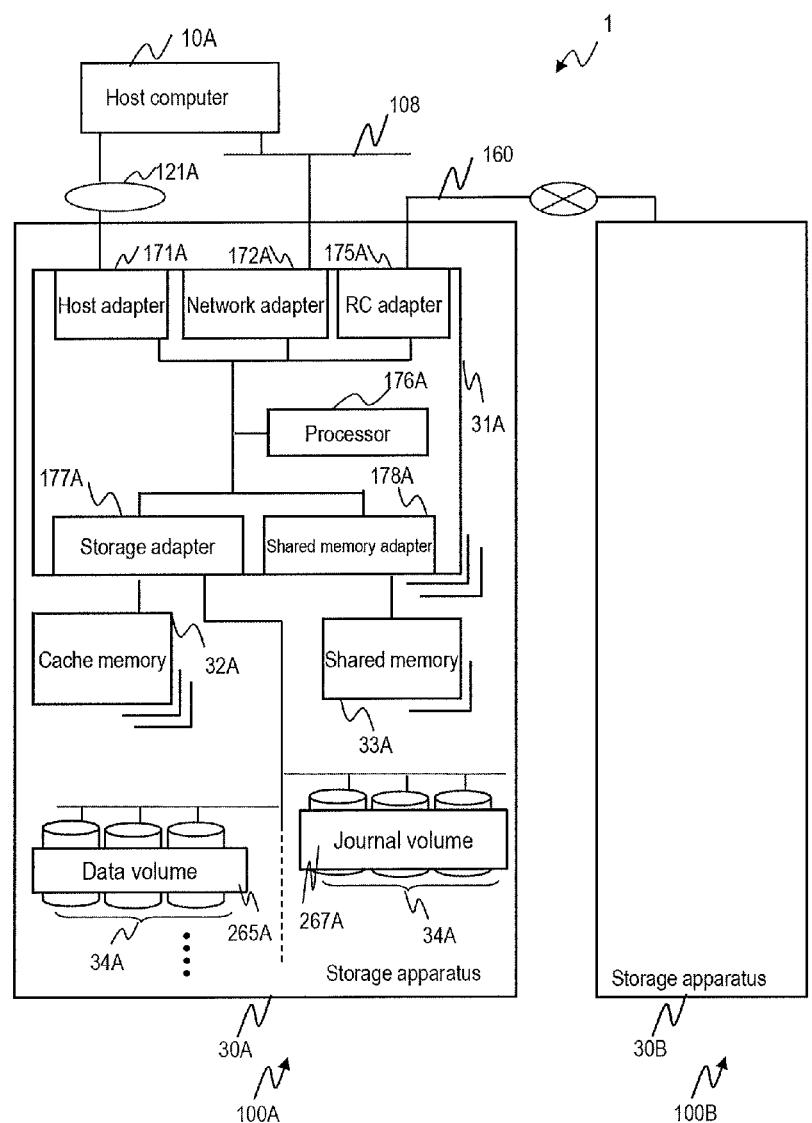
FIG. 1 shows a hardware configuration of a storage system according to an embodiment.

Although information will be described below using expressions such as an "xxx table", information may be expressed using any kind of data structure. In other words, an "xxx table" can also be referred to as "xxx information" in order to show that information is not dependent on data structure. In addition, in the following description, a configuration of each table merely represents an example and one table may be divided into two or more tables and all of or a part of two or more tables may constitute one table.

Furthermore, while an ID is used as identification information of an element in the following description, other types of identification information may be used in place of, or in addition to, an ID.

In addition, in the following description, when describing elements of a same type without distinguishing the elements from one another, reference signs or a common number in reference signs will be used. However, when describing elements of a same type by distinguishing the elements from one another, reference signs of the elements may be used or IDs assigned to the elements may be used in place of the reference signs of the elements.

Furthermore, in the following description, an I/O (Input/Output) request signifies a write request or a read request and may also be referred to as an access request.

In addition, while a "program" is sometimes used as a subject when describing a process in the following description, since a program causes a prescribed process to be performed by appropriately using, for example, a storage resource (such as a memory) and/or an interface device (such as a communication port) when being executed by a processor (such as a CPU (Central Processing Unit)), a "processor" may be used instead as a subject of a process. A process described using a program as a subject may be considered a process performed by a processor or by an apparatus including a processor or a system. Furthermore, a processor may include a hardware circuit which performs a part of or all of processes. A program may be installed in an apparatus such as a computer from a program source. The program source may be, for example, a program distribution server or a storage medium that can be read by a computer. When the program source is a program distribution server, the program distribution server includes a processor (for example, a CPU) and a storage resource, and the storage resource may further store a distribution program and a program that is a distribution target. Furthermore, by having the processor of the program distribution server execute the distribution program, the processor of the program distribution server may distribute the program that is the distribution target to other computers. In addition, in the following description, two or more programs may be realized as one program or one program may be realized as two or more programs.

Furthermore, in the following description, a management system may include one or more computers. Specifically, for example, when a management computer displays information (specifically, for example, when a management computer displays information on its own display device or when a management computer transmits information for display to a remote display computer), the management computer constitutes a management system. In addition, for example, when functions identical or similar to those of a management computer are realized by a plurality of computers, the plurality of computers (when a display computer performs display, the plurality of computers include the display computer) constitute a management system. A management computer (for example, a management system) may include an interface device coupled to an I/O system including a display system, a storage resource (for example, a memory), and a processor coupled to the interface device and the storage resource. The display system may be a display device included in the management computer or a display computer coupled to the management computer. The I/O system may be an I/O device (for example, a keyboard and a pointing device or a touch panel) included in the management computer or a display computer or another computer coupled to the management computer. Moreover, a management computer "displaying display information" may signify that display information is being displayed on the display system and may be performed by having the management computer cause display information to be displayed on a display device included in the management computer or having the management computer transmit display information to a display computer (in the case of the latter, display information is to be displayed by a display computer). In addition, a management computer inputting or outputting information may signify inputting or outputting information to or from the I/O device included in the management computer or inputting or outputting information to or from a remote computer (for example, a display computer) being coupled to a management computer. Outputting information may signify displaying information.

A read process may be described as a readout process. A write process may be described as a writing process or an update process. The processes may be collectively described as access processing.

Hereinafter, an embodiment of the present invention will be described with reference to the drawings.

<Configuration of Storage System>

FIG. 1 shows a hardware configuration of a storage system according to an embodiment.

Two or more sites such as a primary site 100A and a secondary site 100B are provided in order to configure a remote copy. Hereinafter, for the sake of brevity, a reference sign of an element included in the primary site 100A will be a combination of a parent number and a child sign "A" and a reference sign of an element included in the secondary site 100B will be a combination of a parent number and a child sign "B". In addition, when the primary site 100A and the secondary site 100B need not be distinguished from each other, only a parent number will be used as a reference sign. While a primary site and a secondary site in a remote copy configuration are often constructed using storage apparatuses of a same type, since the present embodiment aims to provide a backup solution and uses a remote copy function as one of the means therefor, the types of storage apparatuses used in a remote copy configuration need not be matched with one another. In addition, a host computer need not exist on the side of the secondary site 100B.

The primary site 100A includes a host computer 10 and a storage apparatus 30A. The secondary site 100B includes a storage apparatus 30B. The storage apparatus 30A and the storage apparatus 30B are coupled to one another. The host computer 10 accesses a logical storage area of the storage apparatus 30. The storage apparatus 30 stores data in a storage area configured in a physical storage device 34. The host computer 10 may exist in plurality. Moreover, the storage apparatus 30 can also be described as a storage system or a storage subsystem. Although not shown in the drawings, a management apparatus coupled to the storage apparatuses 30A and 30B via a management network 108 may be provided. The management apparatus manages a configuration of a storage area of the storage apparatus 30 and includes, for example, an input device, an output device, a CPU, a memory, a network adapter, and a storage device.

The primary site 100A and the secondary site 100B execute a remote copy. In this case, a remote copy refers to a technique for duplicating data stored in a storage apparatus to another storage apparatus. A storage source is referred to as a primary site or a local site and a destination in which a duplicate is to be stored is referred to as a secondary site or a remote site.

The host computer 10 includes, for example, an input device, an output device, a CPU, a memory, a disk adapter, a network adapter, and a storage device (not shown). Moreover, at the host computer 10, an application program used by a user and a storage apparatus control program that controls an interface with a storage apparatus are executed by the CPU inside the host computer 10. Specific examples of the host computer 10 include a work station, a personal computer, and a main frame.

The storage apparatus 30 includes a controller 31, at least one cache memory 32, at least one shared memory 33, and the physical storage device 34. In the present embodiment, these pieces of hardware are made redundant.

The controller 31 at least includes a processor 176 and, in the present embodiment, further includes a host adapter 171, a network adapter 172, a remote copy (RC) adapter 175, a storage adapter 177, and a shared memory adapter 178.

The host adapter 171 transmits and receives data to and from the host computer 10 via a storage network 121. The network adapter 172 transmits and receives data necessary for system management (management information) to and from the host computer 10 (or the management apparatus) via a management network 108.

The processor 176 reads a program stored in a non-volatile memory or the like into the shared memory 33 and executes processing defined in the program. In addition, the processor 176 executes input/output processing to/from the physical storage device 34 based on an access request from the host computer 10.

The storage adapter 177 transmits and receives data to and from the physical storage device 34 and the cache memory 32. The shared memory adapter 178 transmits and receives data to and from the shared memory 33.

The cache memory 32 is, for example, a RAM (Random Access Memory) and temporarily stores data to be read from and written into the physical storage device 34.

The shared memory 33 is a hard disk, a flash memory, a RAM, or the like and stores programs to run on the controller 31, configuration information, and the like.

The cache memory 32 and the shared memory 33 may be provided inside the controller 31.

The physical storage device 34 includes a plurality of storage devices. The storage devices are, for example, hard disk drives and mainly store user data. The storage devices may be drives including a semiconductor memory such as a flash memory. The storage devices configure a RAID (Redundant Array of Independent Disks) group based on a RAID configuration. One or more logical storage areas (logical volumes) are created based on the RAID group in the physical storage device 34. A logical volume is associated with a physical storage area included in the physical storage device 34. Each of the logical volumes is used as a data volume such as a PVOL or an SVOL and as a journal volume 267 in accordance with specifications by the user.

Hereinafter, a data volume included in the storage apparatus 30A of the primary site 100A to be a copy source of data duplication will be referred to as a "PVOL (primary volume)" or an "RCPVOL". In addition, a data volume included in the secondary-side storage apparatus 30B to be a duplication destination of data stored in a PVOL will be referred to as an "SVOL (secondary volume or secondary-side (S) volume" or an "RCSVOL".

Next, a remote copy configuration portion of the storage system according to the present embodiment will be described. As described earlier, in the present embodiment, hardware configuration, hardware performance, and the number of pieces of hardware may be the same or may differ between the primary site 100A and the secondary site 100B.

The storage apparatus 30A of the primary site 100A and the storage apparatus 30B of the secondary site 100B are coupled to each other via a communication line to configure a remote copy.

The remote copy adapter 175 is coupled to another storage apparatus 30 via a network between storage apparatuses 160. While the network between storage apparatuses 160 is often a global network such as a public line from the perspective of disaster recovery, the network between storage apparatuses 160 may instead be a local network when storage apparatuses are located within a same room, a same building, or in adjacent buildings. However, it should be noted that the present invention is not limited by modes of such networks.

In the present embodiment, the remote copy is an asynchronous remote copy.

A network adapter other than the network adapter 172 may be provided to couple an external storage apparatus to the storage apparatus 30 via a second network. For example, a Storage Area Network (SAN) can be used as the second network. The external storage apparatus may be identical or similar to the storage apparatus 30 or may be an optical disk library or the like. The external storage apparatus is not directly coupled to the host computer 10 by a network and is accessed via the storage apparatus 30. The external storage apparatus is not recognized from the host computer 10. The host computer 10 is provided with a storage area of the external storage apparatus by being virtualized as a storage area of the storage apparatus 30.

An outline of backup by the storage system according to the present embodiment will now be presented.

Generally, enterprise storage apparatuses are products requiring high performance and high reliability and include sophisticated programs such as an asynchronous remote copy function, a snapshot function, and a deduplication function. The storage system according to the present embodiment constructs a backup solution between the storage apparatuses 30A and 30B which are equipped with such functions. The storage system constructs a remote copy configuration between sites and, when an access request is received by the remote copy primary site 100A and data is updated, an updated difference is transferred to the secondary site 100B. By acquiring a snapshot from a remote copy volume of the secondary site 100B, the storage apparatus 30B creates a full backup image at high speed. A snapshot refers to a function for acquiring snapshot data of data in the storage apparatus 30.

An example of snapshot data acquisition will be described. In order to acquire snapshot data, the storage apparatus 30B creates a pair having a logical volume as a primary volume and a virtual volume as a secondary volume. Snapshot data is acquired by dividing (staticizing) the snapshot pair. When updating data of the primary volume, the storage apparatus 30B copies only data of an updated portion to a pool as pre-update snapshot data. In addition, when storing data of a pre-update snapshot in the pool, the storage apparatus 30B may store the data after deduplication.

As a restore process, the storage system restores a consistency group by copying the remote copy volume and differential data of the snapshot from the secondary site 100B to the primary site 100A at high speed.

Figure 2:
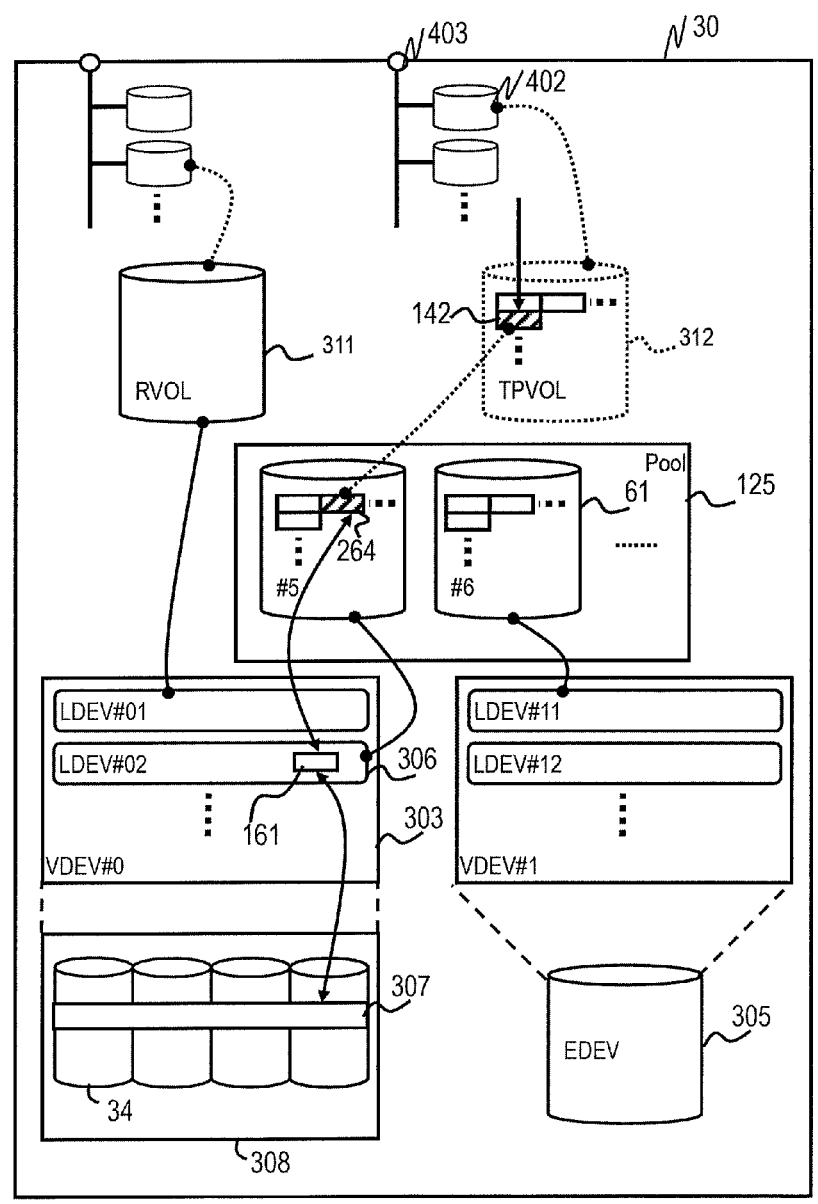
FIG. 2 shows a layer configuration of a storage area.

FIG. 2 shows a layer configuration of a storage area.

Hereinafter, a storage area will be described in order, starting with a lower layer.

A RAID group 308 is provided. As described earlier, the RAID group 308 is a plurality of PDEVs 34 of a same type and having a same communication interface, and includes a stripe line 307 which straddles the plurality of PDEVs 34.

An EDEV 305 is provided. The EDEV 305 is an abbreviation of an external device and is a logical storage device based on a storage resource inside an external storage apparatus (not shown). The storage resource in the external storage apparatus is, for example, a RAID group or a RAID VOL. When data is input to or output from the EDEV 305, data is input to or output from the storage resource in the external storage apparatus on which the EDEV 305 is based.

A VDEV 303 is provided on a layer above the RAID group 308 and the EDEV 305. The VDEV 303 is a virtual storage resource based on the RAID group 308 or the EDEV 305. By partitioning a storage space of the VDEV 303, a plurality of LDEVs 306 are formed in the VDEV 303. The VDEV 303 may constitute one LDEV 306. Hereinafter, a VDEV based on the RAID group 308 may be referred to as a "first-type VDEV" and a VDEV based on the EDEV 305 may be referred to as a "second-type VDEV". Moreover, there may be a third-type VDEV as a virtual storage resource based on neither the RAID group 308 nor the EDEV 305.

A pool 125 is provided on a layer above the VDEV 303. The pool 125 includes a plurality of pool VOLs 61. The pool VOL 61 is associated with any of the LDEVs. Since the pool VOL 61 is an off line VOL, the pool VOL 61 is not associated with a target device specified from the host computer 10. The pool VOL 61 is associated with an LDEV in the first-type VDEVs or an LDEV in the second-type VDEVs. The pool VOL 61 includes a plurality of real pages 161. In the present embodiment, the real page 161 and the stripe line 307 correspond to each other on a one-to-one basis. Data to be stored in the real page 161 is stored in the stripe line 307 corresponding to the real page 161. A plurality of stripe lines 307 may correspond to one real page 161. An LDEV need not be allocated to a TPVOL 312.

An online VOL accessible from the host computer 10 is provided on a layer above the VDEV 303 and the pool 125. Examples of the online VOL include an RVOL 311 and the TPVOL 312. The RVOL 311 is a VOL based on an LDEV (#01) in the first-type VDEV (#0). On the other hand, the TPVOL 312 is a virtual VOL not based on the VDEV 303.

A target device 402 is provided on a layer above the online VOL. One or more target devices 402 are associated with a communication port 403 included in the host adapter 171. The online VOL is associated with the target device 402.

A free page in the pool 125 associated with the TPVOL 312 is allocated to a virtual page 142 of the TPVOL 312.

The host computer 10 transmits an I/O command (a write command or a read command) specifying a target device to the storage apparatus 30A. As described earlier, the RVOL 311 or the TPVOL 312 is associated with the target device. When the storage apparatus 30A receives a write command specifying the target device associated with the TPVOL 312, the storage apparatus 30A selects a free page 264 from the pool 125 and allocates the selected page to a write destination virtual page (a page to which an address specified in the write command belongs) 142. The storage apparatus 30A writes data that is a write target to the allocated page 264. Writing data to the page 264 means that the data is written to an LDEV #02 associated with a pool VOL #5 including the real page 161 allocated to the page 264. Since the LDEV #02 is an LDEV in the first-type VDEV, data to be written to the LDEV #02 is actually written to the stripe line 307 corresponding to the real page 161 of the RAID group 308.

The remote copy volume, the journal volume, and the snapshot volume in the following description will be described as the TPVOL described above. A TPVOL is referred to as a thin provisioning volume or a capacity virtualization volume.

Figure 3:
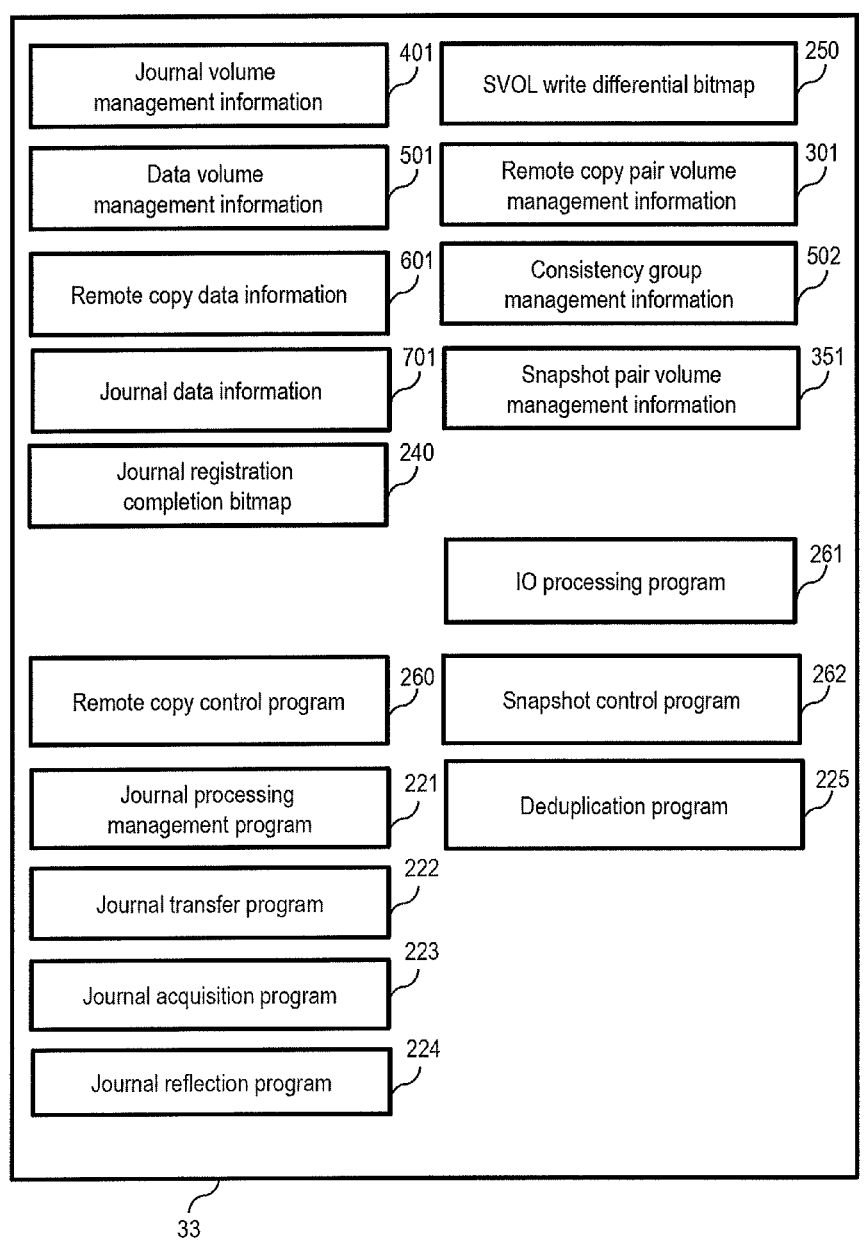
FIG. 3 shows control information and control programs stored in a shared memory.

FIG. 3 shows control information and control programs stored in a shared memory.

The shared memory 33 stores, as control information, journal volume management information 401, consistency group management information 502, data volume management information 501, an SVOL write differential bitmap 250, and a journal registration completion bitmap 240. The shared memory 33 further stores, as control programs, a remote copy control program 260, an IO processing program 261, a snapshot control program 262, a journal processing management program 221, a journal transfer program 222, a journal processing acquisition program 223, a journal reflection program 224, and a deduplication program 225. In addition, the shared memory 33 may further store other programs not shown in the diagram. The deduplication program 225 need not be included.

The remote copy control program 260 controls construction of a remote copy configuration, formation of a remote copy pair, a copy operation from the primary site 100A to the secondary site 100B, and the like.

The IO processing program 261 controls read and write process from/to a data volume and the like in accordance with an access request from the host computer 10.

The journal processing management program 221 manages journal processing (including a journal acquisition process, a journal transfer process, and a journal reflection process) executed by each storage apparatus 30. In addition, during journal processing, communication is performed whenever necessary between the respective journal processing management programs 221 to exchange management information necessary for journal processing.

The journal acquisition program 223 and the journal reflection program 224 are programs for causing the processor 176 to execute acquisition of a journal and reflection of the journal. A single program including the journal acquisition program 223 and the journal reflection program 224 may be provided instead.

In this case, a journal refers to update history information and includes a copy of data used for update (journal data) and journal metadata that is management data of the journal data.

Updating a data volume based on the update history information described above refers to updating to latest data using a journal. As alternative expressions, reflection of data, reflection of a journal (a reflection operation by a journal), restoration of a journal, and the like may be used.

In differential bitmaps such as the SVOL write differential bitmap 250, data of an area with a data size determined in advance is associated with each bit in the bitmap. For example, in a case where data of 64 KB is associated with 1 bit, even when 1 B among the 64 KB is updated, the bit is changed to '1' to cause the content to be also reflected to a copy destination. Other bitmaps share a similar configuration to the differential bitmaps.

The journal registration completion bitmap 240 is a bitmap indicating an area where a journal is registered to a journal volume among areas in a data volume.

In data transmission by a remote copy, a write request is issued from the host computer 10 to the storage apparatus 30A that is a remote copy source and, subsequently, data is transmitted from the storage apparatus 30A to the storage apparatus 30B asynchronously with the write request. Specifically, in asynchronous remote copy, when a write request of data is made from the host computer 10 to the storage apparatus 30A, the storage apparatus 30A returns a write completion signal to the host computer 10 and temporarily accumulates the data. Subsequently, at a prescribed timing, the storage apparatus 30A basically transmits data to the storage apparatus 30B in an order of write requests from the host computer 10. Usually, a plurality of communication lines exist in parallel and, depending on a communication status of each communication line, an order in which the storage apparatus 30B receives data does not necessarily match the order of write requests from the host computer 10. However, by adding information notifying a write order of the storage apparatus 30A, such as sequence numbers (serial numbers) in this case, to data upon data transmission, data can be rearranged in an original order at the storage apparatus 30B. At the secondary site that is a data receiving side, a transmitting-side data transmission order can be matched by reflecting data to the storage apparatus 30B from a smallest sequence number to a latest consecutive sequence number.

A state where data of the storage apparatus 30B is data of the storage apparatus 30A at a certain time point is referred to as "being consistent". For example, when storing data of a database in a volume, a volume storing log data and a volume storing table data may end up being separate volumes. In addition, when data of a plurality of volumes is data at mutually different time points in the storage apparatus 30A, situations may occur in which the database cannot be normally started up even when data of the storage apparatus 30B is used. A collection of volumes is created in order to organize a plurality of pieces of data and ensure consistency. This collection is referred to as a consistency group.

A data structure used in the present embodiment will now be described.

<Data Structure>

Figure 4:
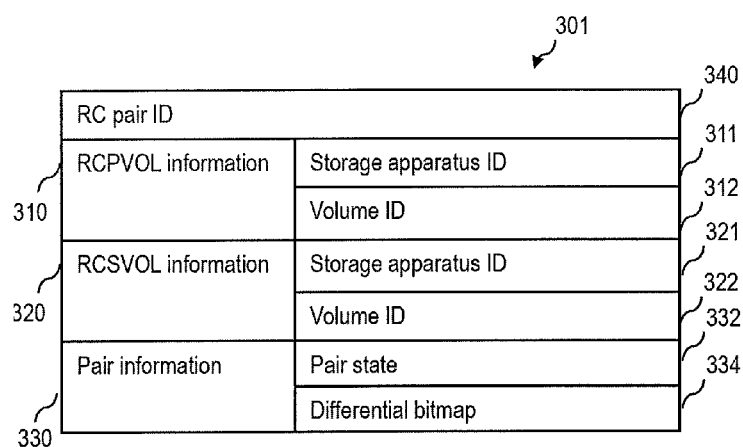
FIG. 4 shows remote copy pair volume management information.

FIG. 4 shows remote copy pair volume management information.

Remote copy pair volume management information 301 is information for managing a remote copy pair. The remote copy pair volume management information 301 is information to be retained for each remote copy pair volume and is at least stored in the storage apparatus 30A.

The remote copy pair volume management information 301 includes a remote copy pair ID (an RC pair ID) 340 which identifies a remote copy pair, RCPVOL information 310 which represents a duplicate source of remote copy data, RCSVOL information 320 which represents a duplicate destination of the remote copy data, and pair information 330 indicating a state of the pair.

RCPVOL indicates a PVOL that is a copy source of a remote copy. RCPVOL information 310 includes a storage apparatus ID 311 and a volume ID 312. RCSVOL indicates an SVOL that is a copy destination of a remote copy. RCSVOL information 320 includes a storage apparatus ID 321 and a volume ID 322.

The storage apparatus ID 311 and the storage apparatus ID 321 are identifiers of the respective storage apparatuses 30 in which the volumes exist. The volume IDs 312 and 322 are identifiers of the volumes in the respective storage apparatuses 30. The volume is uniquely determined by each ID.

Pair information 330 includes a pair state 332 and a differential bitmap 334.

The pair state 332 represents any of "PAIR" indicating that a formation copy is in progress, "COPY" indicating that a differential copy is in progress, and "SUSPEND" indicating that a copy process has been suspended due to a volume or a path being blocked and that a suspended state exists. A formation copy refers to a copy of an entire volume. A differential copy refers to a copy of a difference in a volume.

A differential copy will be described. Using a differential bitmap, transmitting-side and receiving-side volumes are divided into a plurality of areas. In addition, when an update of data is performed in a certain area in the transmitting-side volume, the transmitting-side creates a journal of the updated data. Subsequently, the transmitting-side transmits only a journal of a rewritten area to the receiving-side. This operation is referred to as a differential copy. A differential copy is advantageous in that, when a same area is rewritten many times or the like, an amount of transmission can be reduced compared to ordinary copy.

When the differential copy described above is used, the differential bitmap 334 is bitmap information indicating an area where there is a difference in data between an RCPVOL and RCSVOL or, in other words, a rewritten area in the RCPVOL. When an RCPVOL is updated during SUSPEND, a differential bit indicating an updated area is changed to ON ('1'). In addition, after SUSPEND, by copying only an area where bits are ON (performing a differential copy) based on a bitmap obtained by implementing OR (a logical add) of the differential bitmap 334 of the RCPVOL and a differential bitmap of the RCSVOL, the pair can be restored to a duplicated state. Due to differential copy, a copy transfer amount can be reduced.

Moreover, the operation of implementing a logical add of the differential bitmap 334 of the RCPVOL and the differential bitmap of the RCSVOL is an operation required by the RCSVOL when a rewrite is performed in the secondary site 100B regardless of the primary site 100A and may be omitted when not required. In differential copy, the storage apparatus 30A changes a differential bit to OFF ('0') in areas where copy is completed. All differential bits being OFF means that differential copy has been completed and the RCPVOL and the RCSVOL are in synchronization with each other.

In addition, by performing a differential copy (performing a formation copy) with the entire differential bitmap 334 set to ON during pair creation of a volume, the storage apparatus 30A can copy an entire area of the RCPVOL to the RCSVOL.

Next, processing when an RCPVOL during a formation copy receives a write request from the host computer 10 will be described. The storage apparatus 30A receiving a write request from the host computer 10 to the RCPVOL and differential bits in an area that is a target of the write request in the differential bitmap 334 being ON means that the formation copy of the area has not been finished. Since data of the area is to be copied later by a formation copy, the storage apparatus 30A writes to the RCPVOL but does not create a journal. The storage apparatus 30A receiving a write request from the host computer 10 to the RCPVOL and differential bits in an area that is a target of the write request in the differential bitmap 334 being OFF means that the formation copy of the area has been finished. Therefore, the storage apparatus 30A writes to the RCPVOL and, at the same time, creates a journal of the area in a similar manner to a differential copy and transfers the journal to the storage apparatus 30B.

Figure 5:
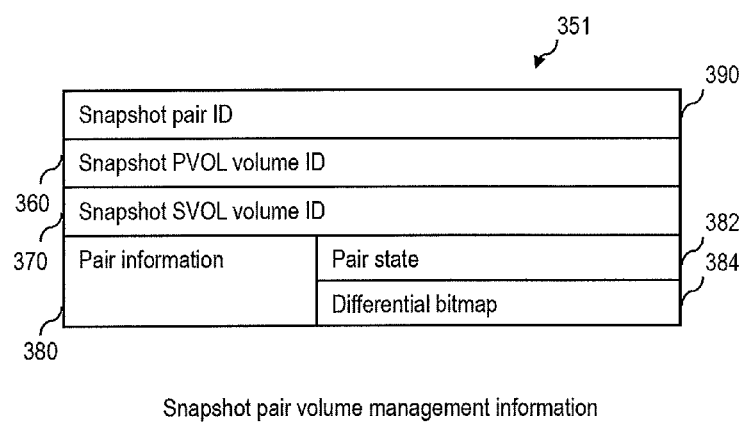
FIG. 5 shows snapshot pair volume management information.

FIG. 5 shows snapshot pair volume management information.

Snapshot pair volume management information 351 is similar to remote copy pair volume management information 301. For example, pair information 380 is similar to pair information 330 described earlier. A pair state 382 and a differential bitmap 384 are similar to the pair state 332 and the differential bitmap 334 described earlier.

However, a snapshot PVOL volume ID 360 is used in place of the RCPVOL information 310 and a snapshot SVOL volume ID 370 is used in place of the RCSVOL information 320. A snapshot PVOL refers to a PVOL that is a copy source of a snapshot and is an RCPSVOL in the present embodiment. A snapshot SVOL refers to a SVOL that is a copy destination of a snapshot and is referred to as an SSVOL in the present embodiment. When the SSVOL is a virtual volume, the snapshot pair volume management information 351 may include a pool ID corresponding to the SSVOL.

Moreover, a snapshot SVOL volume ID need not be configured in the snapshot pair volume management information 351. When not configuring the snapshot SVOL volume ID, the storage apparatus 30B manages only an address of an area in which data is to be stored in a snapshot pool as information of a copy destination of the snapshot in association with the RCSVOL that is a snapshot PVOL. For example, assuming that the snapshot PVOL manages data per page and the pages thereof are represented by #0 to 100, the snapshot pair volume management information 351 manages, with respect to each page, address information where snapshot PVOL-side data is stored in association with address information of a snapshot pool storing snapshot SVOL-side data for each snapshot pair ID (or generation).

In this manner, not providing an SSVOL with a volume ID prevents volume IDs from being consumed even when the number of generations of snapshots increase. There is an upper limit of the number of volume IDs determined in advance, and reconfiguration and the like is required and operational load increases when the upper limit is exceeded. In addition, since an increase in volume IDs causes an increase in management information, an amount of memory for storing the increased management information must be reserved. This method is effective in that the number of generations capable of acquiring snapshots can be increased without consuming volume IDs.

States of a snapshot pair include, for example, a "PAIR" state where data stored in the respective volumes of the snapshot pair are synchronized with each other and contents of respectively stored data are consistent and a "SPLIT" state (which may also be referred to as a "divided" state) in which data is not synchronized between volumes of the snapshot pair.

For example, the storage apparatus 30B changes a pair in the PAIR state to a SPLIT state at a specific time point. In this case, data stored at the specific time point is saved in the SSVOL. Such a process is referred to as "taking a snapshot". Subsequently, as the host computer 10 reads data from the SSVOL and writes the data into another storage apparatus (for example, a tape apparatus), data stored at the time point where a snapshot had been taken can be backed up. Alternatively, the storage apparatus 30B can store the SSVOL itself after taking a snapshot as backup data.

The storage apparatus 30B may use a snapshot group that is a collection of a plurality of pairs of a snapshot. In this case, the storage apparatus 30B can execute a same operation on the plurality of pairs in the snapshot group.

FIG. 6 shows consistency group management information.

The consistency group management information 502 is information for managing a consistency group. The consistency group management information 502 is at least stored in the storage apparatus 30A.

The consistency group management information 502 includes a consistency group ID 511, a pair state 512, a latest sequence number 530, an untransferred sequence number 540, a formalized sequence number 550, pair volume information 560, primary-side (P) journal volume information 570, and secondary-side (S) journal volume information 580.

Data for which a write request is received from the host computer 10 with respect to a primary-side (P) volume in a consistency group is copied to a secondary-side (S) volume that is a remote copy pair of each primary-side (P) volume while maintaining a write request order in the consistency group. In order to maintain the write order, a sequence number 610 (to be described later) is assigned to each piece of remote copy data.

The storage apparatus 30B is capable of reflecting pieces of remote copy data up to those with sequence numbers 610 to the RCSVOL 266. New remote copy data without a sequence number 610 is not reflected. This process of reflecting remote copy data determined by the storage apparatus 30B to be reflectible may be referred to as "formalization".

The consistency group ID 511 is an identifier which uniquely determines a consistency group.

The pair state 512 represents any state of: "PAIR" in which all pair volumes in the consistency group are in a duplicated state; "COPY" in which one or more pair volumes in the consistency group are undergoing a differential copy; "SUSPEND" in which all pair volumes in the consistency group are in a suspended state (a state where there is consistency in the consistency group); and "SUSPEND-E" in which one or more pair volumes in the consistency group are in a suspended state (a state where there is no consistency in the consistency group).

The latest sequence number 530 is a most recently assigned number among the sequence numbers 610 assigned to remote copy data in the consistency group in the storage apparatus 30A.

The untransferred sequence number 540 is an oldest sequence number 610 among the sequence numbers 610 of remote copy data not transferred from the storage apparatus 30A to the storage apparatus 30B. The storage apparatus 30A transfers remote copy data in order starting from the remote copy data with the oldest sequence number 610 among untransferred remote copy data.

The formalized sequence number 550 is a latest sequence number 610 among the sequence numbers 610 of remote copy data of which formalization has been finished in the storage apparatus 30B.

The pair volume information 560 includes the remote copy pair volume management information 301 of each pair included in the consistency group.

The primary-side journal volume information 570 includes a storage apparatus ID 571 with respect to the primary site 100A and indicates the journal volume management information 401 of each journal volume included in the consistency group. The secondary-side journal volume information 580 includes a storage apparatus ID 581 with respect to the secondary site 100B and indicates the journal volume management information 401 of each journal volume included in the consistency group. The storage apparatus IDs 571 and 581 are identifiers of the respective storage apparatuses 30 which include journal volumes.

Figure 7:
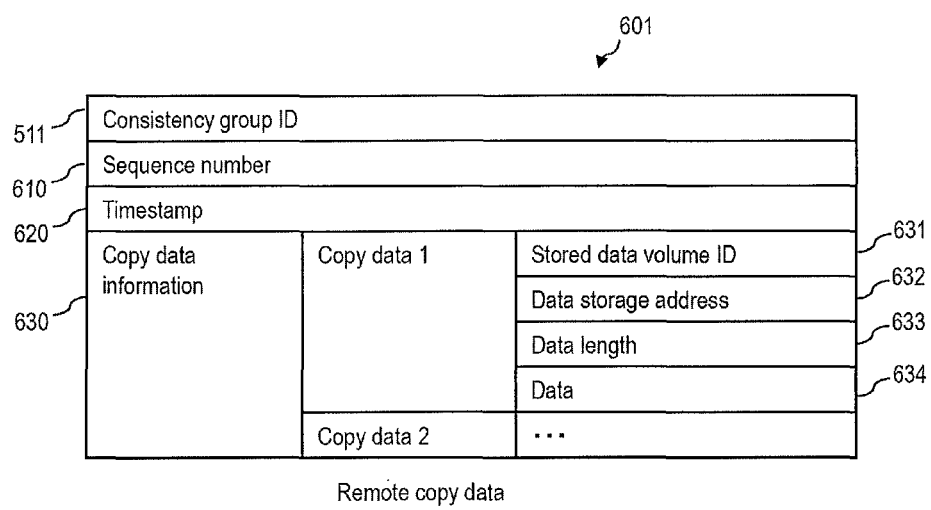
FIG. 7 shows remote copy data.

FIG. 7 shows remote copy data.

Remote copy data 601 is data to be transferred from the storage apparatus 30A to the storage apparatus 30B. The remote copy data 601 includes the consistency group ID 511, a sequence number 610, a timestamp 620, and copy data information 630.

The consistency group ID 511 identifies a consistency group as described above. The sequence number 610 is a serial number assigned in order to maintain a write order in a consistency group as described above.

The timestamp 620 is information representing a time point at which a write request of data had been received from the host computer 10 at the storage apparatus 30A. The timestamp 620 is used in order to determine a time point of data in the storage apparatus 30A to which data in the storage apparatus 30B corresponds.

Copy data information 630 includes, with respect to each piece of copy data, a stored data volume ID 631, a data storage address 632, a data length 633, and data 634. The stored data volume ID 631 is an identifier indicating an RCSVOL in the storage apparatus 30B. The data storage address 632 indicates a location where write data is to be written in an RCSVOL. The data length 633 indicates a size of write data. The data 634 is a copy of data to be written into an RCPVOL, and an RCSVOL is to be write-updated in the same manner as an RCPVOL.

Moreover, there may be one piece of copy data or a plurality of pieces of copy data. When the remote copy data 601 is to be created for each write to the RCPVOL from the host computer 10, there is to be one piece of copy data. When remote copy data 601 is to be created by consolidating write requests received by the storage apparatus 30A from the host computer 10 in a certain time interval (for example, in a 10-second interval), there is to be a plurality of pieces of copy data. In this case, the copy data may be the same as the write data from the host computer 10. Alternatively, the storage apparatus 30A may store an area updated by the host computer 10 as a difference and adopt data in the area of the difference as copy data. When there are write requests from a plurality of host computers 10 to a same area, adopting data in the area of the difference as copy data enables an amount of copy data to be reduced.

Figure 8:
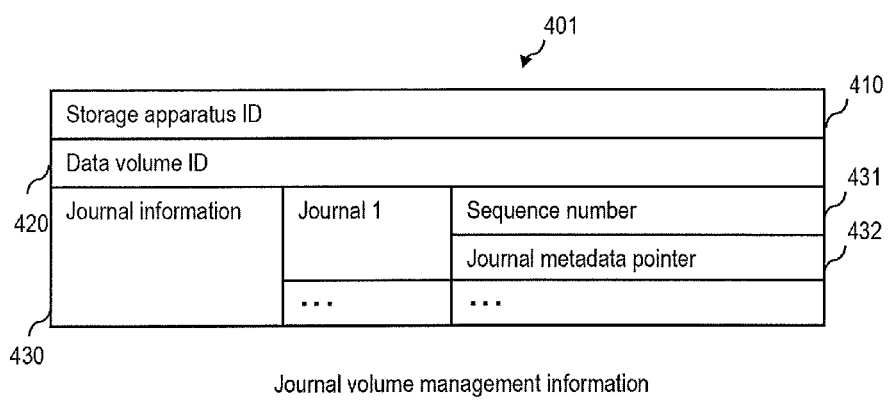
FIG. 8 shows journal volume management information.

FIG. 8 shows journal volume management information.

The journal volume management information 401 is information for managing a volume (a journal volume) which stores a journal of remote copy. A journal and journal data represent an update history of data stored in the storage apparatus 30A and are obtained by, for example, adding a write request time point or the like to remote copy data. The journal volume management information 401 is information to be retained for each journal volume and is stored in a shared memory 33A of the storage apparatus 30A and a shared memory 33A of the storage apparatus 30B.

The journal volume management information 401 includes a storage apparatus ID 410, a volume ID 420, and journal information 430. The storage apparatus ID 410 identifies each storage apparatus 30, and the volume ID 420 identifies a journal volume in each storage apparatus 30. When the journal volume is a virtual volume, the journal volume management information 401 may include a pool ID of a pool corresponding to the journal volume.

The journal information 430 includes, with respect to each journal stored in a journal volume, a sequence number 431 and a journal metadata pointer 432. The journal metadata pointer 432 is a pointer representing whereabouts of journal metadata. Details of the sequence number 431 and the journal metadata will be provided later.

Figure 9:
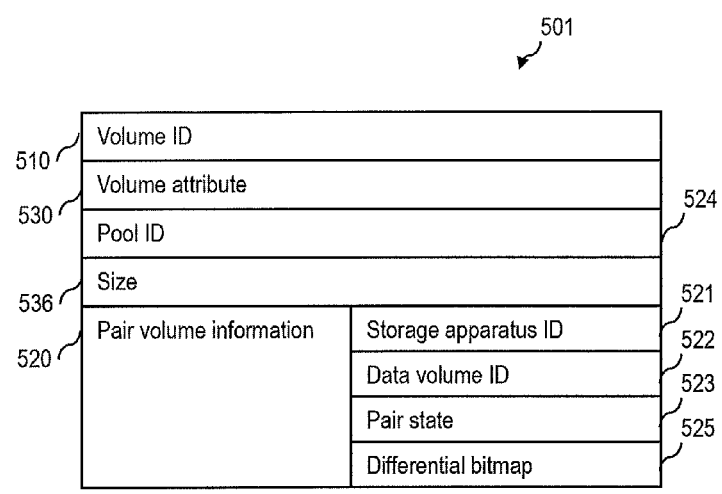
FIG. 9 shows data volume management information.

FIG. 9 shows data volume management information.

The data volume management information 501 is information for managing a data volume and includes a volume ID 510 for identifying a data volume in the storage apparatus 30, a volume attribute 530 of the data volume, a pool ID 524 corresponding to the data volume, a size 536 of the data volume, and pair volume information 520 which is information on a data volume that forms a pair with the data volume.

The pair volume information 520 includes a storage apparatus ID 521 that is an identifier of a storage apparatus in which the pair volume exists, a data volume ID 522 which identifies the pair volume, and a pair state 523 which indicates a state of the pair. A data volume is uniquely determined by combining the storage apparatus ID 521 with the data volume ID 522.

The pair state 523 represents any of the states of "PAIR" in which a data volume is in a duplicated state (a state where there is consistency of data in a volume), "COPY" in which a differential copy is in progress, and "SUSPEND" in which a copy process has been suspended due to a volume or a path being blocked and a suspended state exists.

The volume attribute 530 is information indicating an identifier of an attribute of a logical volume. When the data volume is the RVOL 311, an identifier indicating an RVOL (in other words, in the case of a "real volume", an identifier thereof) is stored, but when the data volume is the TPVOL 312, an identifier indicating a TPVOL (in other words, in the case of a "thin provisioning volume=a capacity virtualization volume", an identifier thereof) is stored. In addition, when the data volume is configured in a pool, an identifier indicating a pool attribute is stored. In the volume attribute 530, a corresponding identifier is similarly stored even with respect to an external volume and the like.

In the pool ID 524, when the data volume is configured in a pool, an identifier of a pool to which the data volume belongs is stored. When the data volume is configured in a virtual volume, the pool ID 524 is a pool ID of a pool to which a storage area is allocated when storing data.

The size 526 indicates a capacity configured in the data volume.

In addition to the above, although not shown, the data volume management information 501 manages information such as a group of numbers of physical hard disks constituting the data volume, a RAID level at which a volume is configured from the physical hard disks, LU numbers, and physical port numbers.

Figure 10:
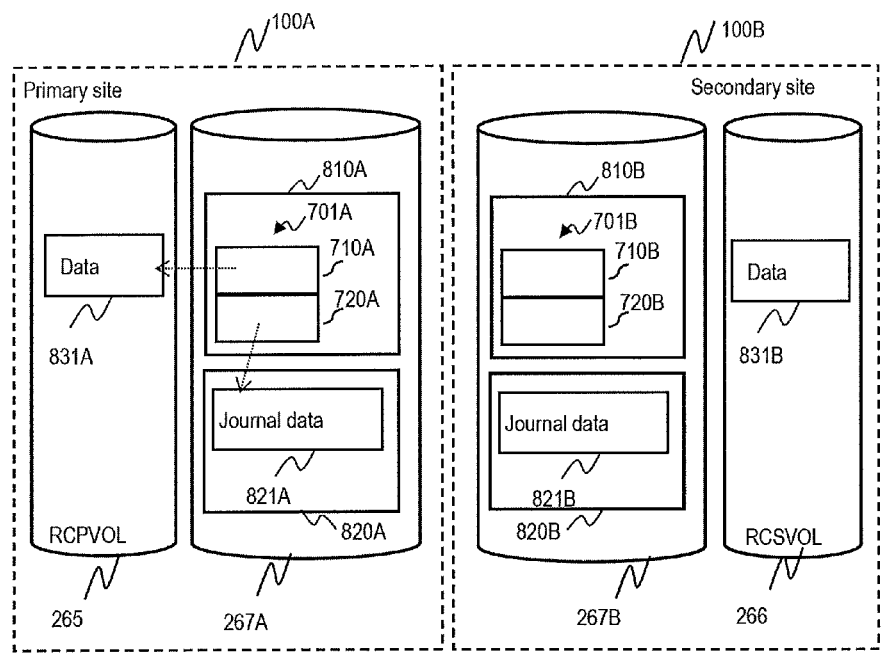
FIG. 10 shows a relationship between journal data and journal metadata.

FIG. 10 shows a relationship between journal data and journal metadata.

In this case, a journal includes journal data 821 which is a copy of data and journal metadata 701 which is management information of the journal data.

Generally, each of an RCPVOL 265, an RCSVOL 266, and journal volumes 267A and 267B are managed in units of logical blocks determined in advance (for example, 512 KB). A logical block address is assigned to each logical block.

The journal volume 267A of the primary site 100A includes a journal metadata area 810A and a journal data area 820A. The journal data area 820A stores journal data 821A, in other words, a copy of data 831A written into the RCPVOL 265 by a write command. The journal metadata area 810A stores journal metadata 701A related to the journal data 821A.

The journal volume 267B of the secondary site 100B includes a journal metadata area 810B and a journal data area 820B in a similar manner to the journal volume 267A. The journal metadata area 810B stores journal metadata 701B transferred from the journal metadata area 810A of the journal volume. The journal data area 820B stores journal data 821B transferred from the journal data area 820A of the journal volume 267A.

Figure 11:
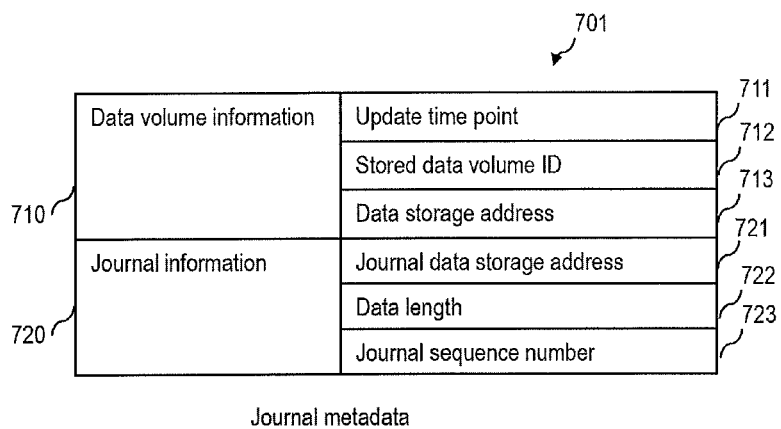
FIG. 11 shows journal metadata.

FIG. 11 shows journal metadata.

The journal metadata 701 is management information for associating data and journal data with each other and includes data volume information 710 and journal information 720.

The data volume information 710 includes an update time point 711 which indicates a time point at which data is updated, a data volume identifier 712 which identifies a data volume storing the updated data, and a data storage address 713 which indicates a start address on the data volume storing the data.

The journal information 720 includes a journal data storage address 721 which indicates a start address on a journal volume storing the journal data, a data length 722 of the journal data, and a journal sequence number 723 which is a serial number of a journal in a consistency group allocated when acquiring the journal.

In the relationship between a journal and data described earlier, the journal metadata 701B has information on a data update performed at the RCPVOL 265, and the journal information 720B indicates an address, a data length, and a sequence number of the corresponding journal data 821B. The storage apparatus 30B is capable of reflecting an update at the RCPVOL 265 to the RCSVOL 266 by copying the journal data 821B from the journal data area 820B in the journal volume 267B to an address corresponding to the data storage address 713B of the RCSVOL 266.

Each address may be expressed by a Logical Block Address (LBA) on a volume. A data length may be expressed by the number of logical blocks. In addition, a location where data is stored may be expressed by a difference (an offset) from a base address (a start LBA) of an area (a journal data area or a journal metadata area) where the data is stored. In the present embodiment, although the data length of the journal metadata 701 is constant (for example, 64 bytes), the data length of journal data is dependent on data updated by a write command and is not constant.

When defining a consistency group, each storage apparatus 30 configures the journal metadata area 810 and the journal data area 820 with respect to the configured journal volume 267. Specifically, a start LBA and the number of blocks of each area are configured.

The storage apparatus 30 cyclically uses a journal volume by starting from a start of a storage area in an order of sequence numbers and, once the storage area is used to its end, returning to the start. A journal of the primary site 100A is purged at a timing where the journal has already been transferred to the secondary site 100B or a timing where reflection of the journal has been finished at the secondary site 100B to sequentially release areas of journals. In a similar manner, a journal of the secondary site 100B is purged at a timing where reflection of the journal to the RCSVOL 266 has been finished to sequentially release areas of journals. In addition, while the storage apparatus 30 stores journals in a journal volume, journals may be stored in the cache memory 32 or in an exclusively provided hard disk, flash memory, RAM, or the like.

A remote copy configuration is constructed as a GUI (Graphical User Interface) or the like included in the host computer 10 or a maintenance terminal (or a management apparatus) coupled to the storage apparatus 30 issues a pair creation command to the storage apparatus 30 and associates, as a pair, the RCPVOL 265 included in the storage apparatus 30A that is a copy source and the RCSVOL 266 included in the storage apparatus 30B that is a copy destination of data stored in the RCPVOL 265 with each other. In addition, using each journal processing management program 221, the storage apparatus 30 allocates a journal volume storing a corresponding journal to the RCPVOL 265 and the RCSVOL 266 to form a consistency group (a pair of data volumes and a pair of journal volumes).

First, a formation copy process is executed in which data is copied from the RCPVOL 265 to the RCSVOL 266. When copying, data from a volume start area to an end area of the RCPVOL 265 is transferred.

<Backup Processing Operation>

Hereinafter, an operation of backup of the RCPVOL 265 will be described.

Figure 12:
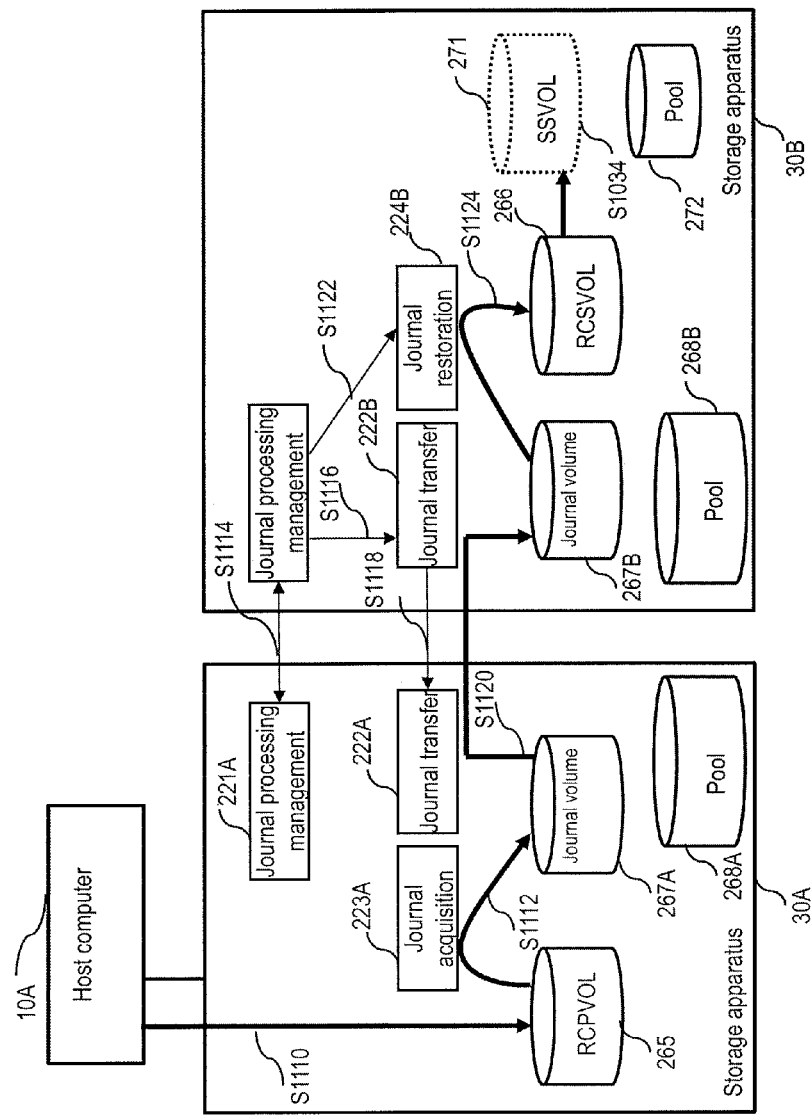
FIG. 12 shows an outline of journal processing.

FIG. 12 shows an outline of journal processing.

Journal processing when an access is accepted by the storage apparatus 30A of the primary site 100A during normal operation will now be described.

The storage apparatuses 30A and 30B respectively execute the journal processing management program 221 and control journal processing.

By executing the journal acquisition program 223A, the storage apparatus 30A stores a copy of data to be written into the RCPVOL 265 as journal data in the journal volume 267A. In addition, the storage apparatus 30A also stores journal metadata as a part of a journal in the journal volume 267A. These processes constitute a journal acquisition process.

Meanwhile, the storage apparatus 30B executes a journal reflection program 224B to perform a journal reflection process. The journal reflection program 224B reflects data to the RCSVOL 266 based on the journal stored in the journal volume 267B and reflects data updated at the RCPVOL 265 to the RCSVOL 266.

Figure 13:
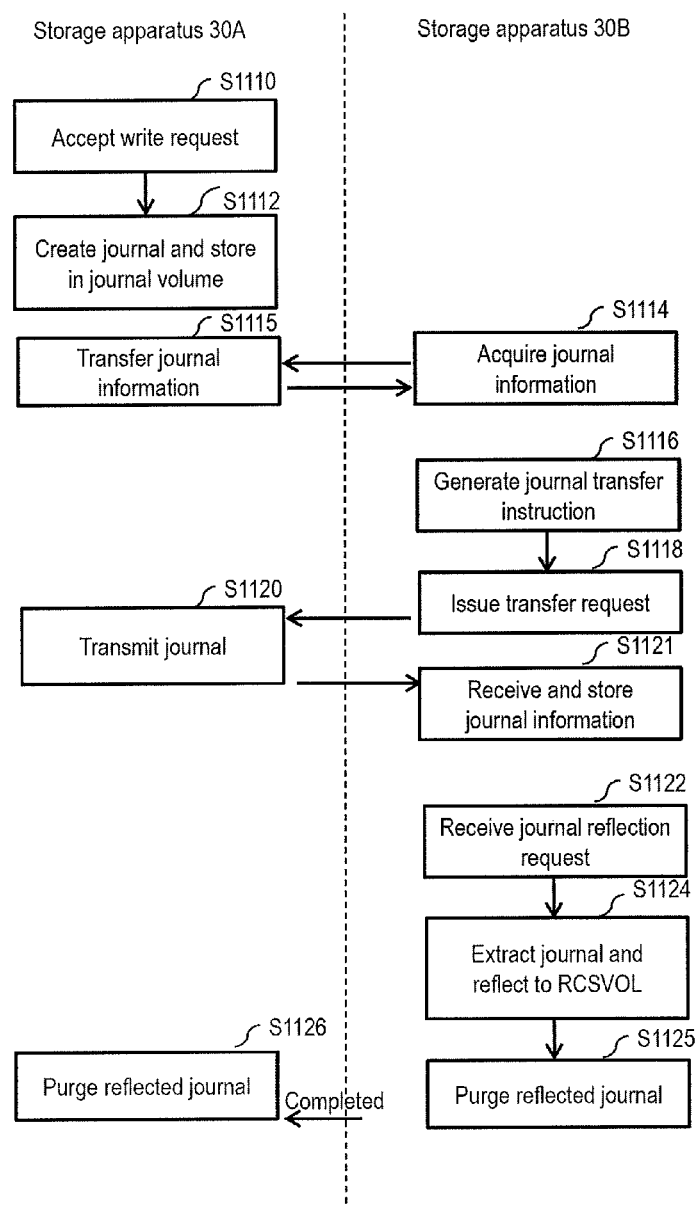
FIG. 13 shows details of journal processing.

FIG. 13 shows details of journal processing.

In the storage apparatus 30A, when the IO processing program 261 receives a write request from the host computer 10 to the RCPVOL 265 (S1110), the IO processing program 261 writes data received from the host computer 10 into the RCPVOL 265. The journal acquisition program 223 creates a journal and stores the created journal in the journal volume 267A (S1112). At this point, the journal acquisition program 223 refers to the consistency group management information 502 stored on the shared memory 33 of the storage apparatus 30A, determines a journal storage destination, acquires a number subsequent to the latest sequence number 530 as a sequence number, and creates journal metadata 701. Specifically, the journal acquisition program 223 creates a journal from journal data that is a copy of the data to be written and the created journal metadata 701, and stores the created journal in the journal volume 267B. The storage apparatus 30A performs a write completion response to the host computer 10 at a time point where write to the storage apparatus 30A is completed. Transfer of the journal from the storage apparatus 30A to the storage apparatus 30B is performed asynchronously with the write request.

The storage apparatus 30B acquires information on journals of the storage apparatus 30A at a prescribed timing such as at constant intervals. At the storage apparatus 30B, a journal processing management program 221B transmits, to the storage apparatus 30A, a request for acquiring information regarding a journal creation status from the storage apparatus 30A (S1114). Examples of information regarding a journal creation status include a capacity of a journal in a journal volume and an oldest time point of a journal. A journal processing management program 221A transmits information regarding a journal creation status to the storage apparatus 30B in accordance with the request (S1115). The journal processing management program 221B creates a journal transfer request using the acquired information.

Next, a process of transferring a journal from the storage apparatus 30A to the storage apparatus 30B will be described. At the storage apparatus 30B, when a journal transfer instruction is generated in accordance with an input of the instruction by the user via a GUI or a schedule determined advance, the journal processing management program 221B issues a journal transfer request to a journal transfer program 222A of the storage apparatus 30A (S1116). Examples of a schedule include upon storage of a certain amount of journals in the journal volume 267A at the storage apparatus 30A and at fixed intervals.

The journal transfer request includes a journal (or a plurality of journals) to be copied, the journal volume 267A in which the journal is stored, information specifying the storage apparatus 30A which includes the journal volume, and information specifying the journal volume 267B in which a copied journal is to be stored. The journal processing management program 221B creates a journal transfer request from information acquired from the consistency group management information 502 on the shared memory 33.

A journal transfer program 222B having received the journal transfer request issues a read command with respect to the journal specified in the journal transfer request to the storage apparatus 30A (S1118). The journal processing management program 221A of the storage apparatus 30A having received the read command transmits the journal specified in the read command to the storage apparatus 30B (S1120). The journal processing management program 221B of the storage apparatus 30B having received the journal stores the received journal in the journal volume 267B specified in the journal transfer request (S1121).

Subsequently, the journal processing management program 221B of the storage apparatus 30B issues a journal reflection request to the journal reflection program 224B of the storage apparatus 30B (S1122). The journal reflection program 224B having received the journal reflection request reflects data of the RCPVOL 265 to the RCSVOL 266 by writing journal data into the RCSVOL 266 in accordance with the sequence number of the journal in the journal volume 267B (S1124). Moreover, the journal reflection program 224B purges the area in which the journal used for the reflection had been stored (S1125). Accordingly, the area can be used to store a new journal.

In addition, the journal reflection program 224B notifies the journal processing management program 221A of the storage apparatus 30A of a sequence number of the journal of which data has been reflected to the RCSVOL 266. Accordingly, the journal processing management program 221A releases an area of the journal volume 267A of the storage apparatus 30A in which the journal reflected to the RCSVOL 266 had been stored (S1126). This area can now be used to store a new journal. Moreover, the purging of the journal need not be performed immediately after receiving the notification. Journals may be periodically purged or may be purged in accordance with an instruction from the user.

According to the journal processing described above, by performing an asynchronous remote copy from the RCPVOL 265 to the RCSVOL 266, a response time to an access by the host computer 10 to the RCPVOL 265 can be reduced as compared to when performing a synchronous remote copy. By having the storage apparatus 30A create a marker when a snapshot creation condition is satisfied and having the storage apparatus 30B create a snapshot of the RCSVOL 266 upon detecting a marker, a snapshot of the RCPVOL 265 at a specific time point can be created in the secondary site 100B. Accordingly, when a fault occurs at the primary site 100A, recovery can be readily performed using the secondary site 100B. By using the RCSVOL 266 as a TPVOL, management of capacity of the RCSVOL 266 and the like can be readily performed.

A modification of journal processing will now be described.

In journal processing according to the modification, a journal is transferred by issuing a write command from the storage apparatus 30A for writing data to the storage apparatus 30B instead of having the storage apparatus 30A wait for a read command from the storage apparatus 30B.

In journal processing according to the modification, the journal processing management program 221A of the storage apparatus 30A issues a journal transfer request to the journal transfer program 222A in place of S1116. The journal transfer request includes the journal volume 267A in which the journal to be transmitted to the storage apparatus 30B is stored, information specifying the storage apparatus 30B, and information specifying the journal volume 267B in which the journal is to be stored in the storage apparatus 30B. The journal processing management program 221A acquires these pieces of information from consistency group management information 502A stored in the shared memory 33.

The journal transfer program 222A having received the journal transfer request transmits the specified journal to the storage apparatus 30B by issuing a write command to the storage apparatus 30B in place of S1118. The storage apparatus 30B stores the journal received as a write command from the storage apparatus 30A in an area of the journal volume 267B specified by the command.

Methods of storing a journal include a method of storing the journal in a physical volume and a method of creating a journal volume with a thin provisioning volume and storing the journal in a pool 268.

Details of the process of reflecting a journal to an RCSVOL in the storage apparatus 30B will be described.

The storage apparatus 30B configures the RCSVOL 266 and the journal volume 267B in a capacity virtualization (thin provisioning) volume. The storage apparatus 30B stores remote copy data transferred from the storage apparatus 30A in a remote copy pool. Specifically, the storage apparatus 30B stores a journal transferred from the storage apparatus 30A in a pool 268B. The storage apparatus 30B obtains an update target page in the RCSVOL 266 from journal metadata. When data is already stored in the update target page, the storage apparatus 30B overwrites data into the update target page. When data is not stored in the update target page, the storage apparatus 30B stores an address of a page of the pool 268B in which journal data is stored in a data storage address which manages the update target page. In this manner, the storage apparatus 30B is capable of allocating a page in the pool 268B to the RCSVOL 266 by a conversion of mapping.

In addition, the RCPVOL 265 of the storage apparatus 30A may be a capacity virtualization volume.

The deduplication program 225 of the storage apparatus 30B may execute a deduplication process on a journal having been transferred from the storage apparatus 30A.

Figure 14:
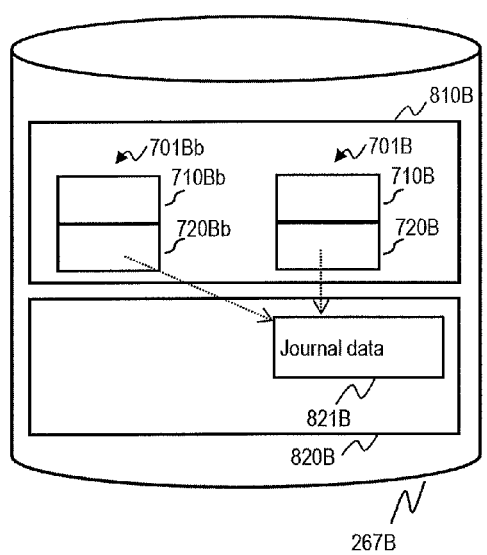
FIG. 14 shows a deduplication process.

FIG. 14 shows a deduplication process.

The deduplication program 225 determines whether or not journal data in the journal transferred from the storage apparatus 30A to the storage apparatus 30B is the same as the journal data stored in the pool 268B (journal data prior to being reflected to the RCSVOL 266). When it is determined that the journal data is the same, the deduplication program 225 stores a value of a journal data storage address 721B in the journal metadata 701B corresponding to the journal data 821B stored in the pool 268B in a journal data storage address 721Bb in journal metadata 701Bb corresponding to the transferred journal data. In this case, the deduplication program 225 does not write the transferred journal data into the pool 268B. Accordingly, the storage apparatus 30B can prevent duplicated data from being stored and can reduce usage amount of the pool 268B. When it is determined that the journal data is not the same, the deduplication program 225 allocates a free area to the journal volume 267B from the pool 268B and stores the transferred journal data. In either case, an entry of the transferred journal metadata 701Bb is required. The deduplication program 225 may determine whether or not the two pieces of journal data are the same by calculating and saving a hash value of the transferred journal data and comparing two hash values with one another.

Alternatively, the deduplication program 225 may determine whether or not journal data in the journal transferred from the storage apparatus 30A to the storage apparatus 30B is the same as data in the pool 268B.

Note that the deduplication program 225 may deduplicate data to be reflected to the RCSVOL 266 and store the deduplicated data in the pool 268B.

Next, an operation when a snapshot acquisition condition is satisfied will be described.

When the snapshot acquisition condition is satisfied, the storage system according to the present embodiment creates a snapshot of the RCPVOL 265 in the storage apparatus 30B. For example, the snapshot acquisition condition is that the storage apparatus 30A receives a snapshot acquisition instruction that instructs creation of a snapshot from the host computer 10. In addition, for example, when a time point where a snapshot is to be acquired from the host computer 10 to the storage apparatus 30A is configured, the snapshot acquisition condition is that the time point is reached.

Since the storage system according to the present embodiment executes asynchronous remote copy, a situation that a primary volume (the RCPVOL 265) of the asynchronous remote copy of the storage apparatus 30A and a secondary volume (the RCSVOL 266) of the asynchronous remote copy of the storage apparatus 30B, the RCPVOL 265 and the RCSVOL 266 do not match each other is occurred. Attempting to acquire a snapshot in a state where the RCPVOL 265 and the RCSVOL 266 do not match each other as described above does not result in obtaining a snapshot of the RCPVOL 265 at a desired moment. Acquiring a snapshot requires that the storage apparatus 30A and the storage apparatus 30B are in a same state, in other words, in a staticized state.

The storage apparatus 30B sequentially reads journals, and when a marker is found in a journal during a reflection operation to the RCSVOL 266, the storage apparatus 30B can acquire a snapshot of the RCSVOL 266 in the SSVOL. A marker refers to information indicating that consistency is attained in a consistency group during the creation of a snapshot of the RCPVOL 265. For example, the marker may be a data pattern configured in advance or may include journal metadata indicating an address configured in advance.

Accordingly, the storage system can create, in the secondary site 100B, a snapshot of the RCPVOL 265 at a time point instructed to the primary site 100A.

Alternatively, the host computer 10 may issue a snapshot acquisition instruction to the storage apparatus 30A. Alternatively, the host computer 10 may stop an I/O request while issuing a snapshot acquisition instruction. In this case, the storage apparatus 30B notifies the storage apparatus 30A that a snapshot has been created and returns a response to the snapshot acquisition instruction to the host computer 10. In response thereto, the host computer 10 resumes the I/O request.

A management apparatus may issue a snapshot acquisition instruction to the storage apparatus 30A and configure a time point of snapshot acquisition to the storage apparatus 30A in advance.

In order to create a staticized state of the RCPVOL 265 in a proactive manner, the storage apparatus 30A may stop I/O in accordance with a snapshot acquisition instruction.

When the storage apparatus 30B creates a capacity virtualization volume by thin provisioning as the journal volume 267B, an entity of the journal is stored in the pool 268B. In the following description, a case where a plurality of journal volumes use the same pool 268B will be explained. When a journal is stored in the pool 268B, the journal transfer process of S1120 causes the journal to be transferred from a pool 268A to the pool 268B. A page refers to a storage unit for managing a storage area of a pool. Examples of a page size include 8 MB and several ten MB.

When the storage apparatus 30A receives a snapshot acquisition instruction with respect to the RCPVOL 265, the storage apparatus 30A may store the instruction in a journal the journal may be transferred to the storage apparatus 30B, and a snapshot may be acquired when the storage apparatus 30B detects the snapshot acquisition instruction in the journal. In other words, by using a snapshot acquisition instruction as the marker described earlier, the RCPVOL 265 and the RCSVOL 266 are placed in a state upon snapshot acquisition by staticizing the RCPVOL 265 and transferring journals up to the time point of staticization.

Figure 15:
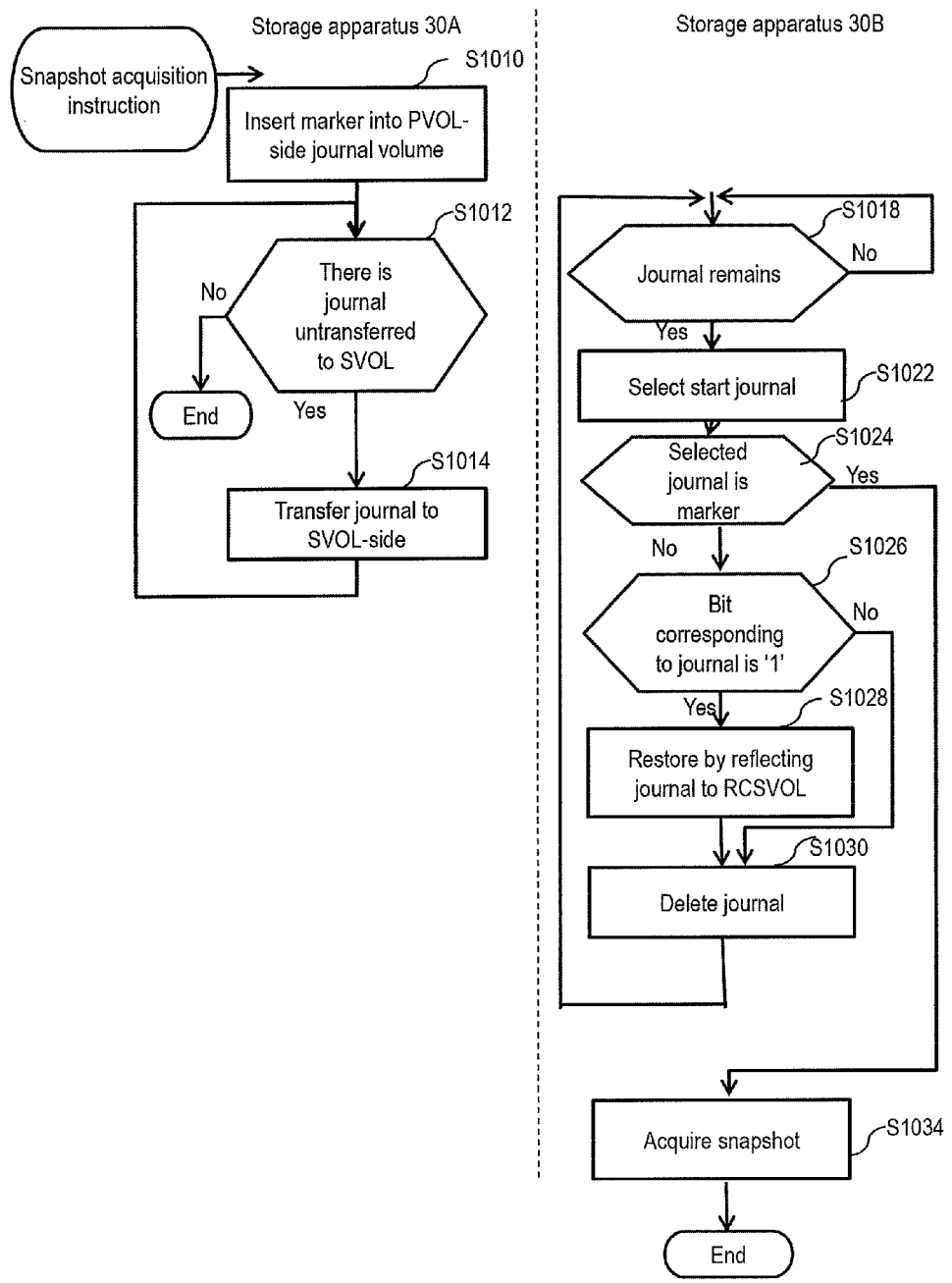
FIG. 15 shows journal processing in a case where a snapshot acquisition instruction is issued.

FIG. 15 shows journal processing in a case where a snapshot acquisition instruction is issued.

First, processing by the storage apparatus 30A will be described. When snapshot acquisition is instructed, the journal processing management program 221A inserts a marker in a last-in-order journal stored at that time point in the journal volume 267A of the RCPVOL 265 (S1010). The marker indicates that the journal is a last journal before snapshot acquisition.

Journals of the RCPVOL 265 are asynchronously transferred to the storage apparatus 30B at a timing determined in advance and in a number determined in advance. The journals are reflected following an order of time points at which the journals had been created. When the timing arrives, the journal processing management program 221A determines whether or not journals untransferred to the RCSVOL 266 remain in the journal volume 267A of the RCPVOL 265 (S1012). When a journal remains (YES in S1012), the journal transfer program 222A transfers the journal to the storage apparatus 30B (S1014). The transferred journal is stored in the journal volume 267B. When the transfer of all journals up to the snapshot acquisition instruction has been finished (in other words, transfer of the marker has been completed) (NO in S1012), a controller 31A ends the processing.

While the journal processing management program 221A determines whether or not journals have been transferred in this case, alternatively, a remote copy control program 260B of the storage apparatus 30B may determine whether or not all journals up to the snapshot acquisition instruction have been acquired (whether a marker has been transferred) from the journal volume 267A and, if not, the journal transfer program 222B may transmit a journal read request to the storage apparatus 30A and the journal transfer program 222A may transfer journals in response to the request.

Next, journal processing by the storage apparatus 30B will be described. The journal reflection program 224B determines whether or not there are journals unreflected to the RCSVOL 266 in the journal volume 267B (S1018). When there is no unreflected journal (No in S1018), the journal reflection program 224B stands by until a journal is transmitted from the storage apparatus 30A. When there is unreflected journal (Yes in S1018), the journal reflection program 224B selects a journal with a youngest sequence number among the unreflected journals (S1022) and determines whether or not the selected journal is a marker (S1024).

When the journal is not a marker (No in S1024), since the selected journal is an unreflected journal, the journal reflection program 224B searches a position of the RCSVOL 266 to which an update by the journal corresponds to, and determines whether or not a bit corresponding to the position in the SVOL write differential bitmap 250 is '1' (S1026). Specifically, the journal reflection program 224B refers to a position (an address) in the RCSVOL 266 from information which indicates an address where corresponding journal data is stored and which is stored in the journal metadata 701. The SVOL write differential bitmap 250 manages data in size units determined in advance by associating the data to 1 bit in the bitmap. The bitmap is used by associating bits in the size units described above from the start of an area in a data volume. For example, when addresses in the RCSVOL 266 corresponding to a bit #10 in the SVOL write differential bitmap 250 are #001 to #100 and the data storage address 713 corresponding to the journal data is #003, the corresponding bit in the SVOL write differential bitmap 250 is the bit #10. In this manner, the journal reflection program 224B is capable of specifying a bit in the SVOL write differential bitmap 250 from an address in the RCSVOL 266.

The journal reflection program 224B specifies a bit corresponding to journal data, and when the bit is '1' (Yes in S1026), the journal reflection program 224B determines that data in the RCSVOL 266 is not latest data, in other words, there is a possibility that data in the RCSVOL 266 does not match data in the RCPVOL 265, reflects the journal data to the RCSVOL 266 (S1028), and deletes the journal data from the journal volume 267B (S1030). The journal reflection program 224B repeats similar processing when there is a next journal.

When the next journal is a marker (Yes in S1024), the journal reflection program 224B recognizes that reflection of all unreflected journals has been completed. In other words, a state where same data is stored in the RCPVOL 265 and the RCSVOL 266 is created. Subsequently, a snapshot control program 262B acquires a snapshot from the RCSVOL 266 (S1034). At this point, the snapshot control program 262B creates a duplicate of the RCSVOL 266 which is a copy source of a snapshot pair in a snapshot SVOL (SSVOL) 271 that is a copy destination of the snapshot pair. The SSVOL 271 in this case is a virtual volume. The snapshot control program 262B maps a page in the pool 268B in which an entity of the RCSVOL 266 is stored to the SSVOL 271.

When the storage apparatus 30A receives, in a state where a formation copy has not been finished, a write request to a location prior to the formation copy after receiving a snapshot acquisition instruction, since the state prior to update must be stored in the RCSVOL 266 of the storage apparatus 30B, the storage apparatus 30A registers pre-update data of the location as a journal. After reflecting journals existing before the marker and the formation-copied data to the RCSVOL 266, the storage apparatus 30B creates a snapshot. Subsequently, after the formation copy process is completed, the storage apparatus 30B reflects journals after the marker to the RCSVOL 266.

Hereinafter, details of snapshot creation (S1034) will be described.

Figure 16:
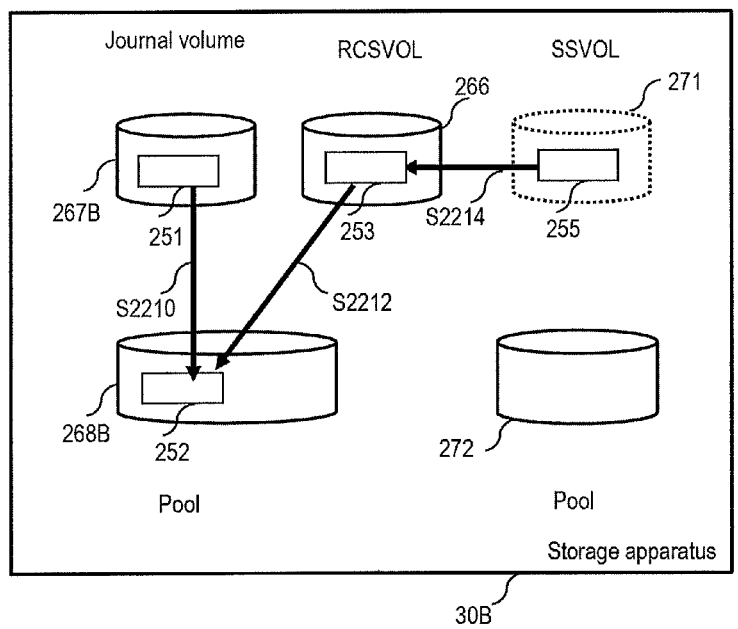
FIG. 16 shows a relationship between an RCSVOL and an SSVOL during snapshot creation.

FIG. 16 shows a relationship between an RCSVOL and an SSVOL during snapshot creation.

Due to the journal processing described above, the journal transferred from the storage apparatus 30A to the storage apparatus 30B is stored in the journal volume 267B. Journal data that is an entity of a page 251 in the journal volume 267B is stored in a page 252 in the pool 268B. A data storage address in the journal metadata 701 indicates an address of the page 252 (S2210).

The storage apparatus 30B sequentially retrieves journals from the journal volume 267B and reflects the retrieved journals to the RCSVOL 266 in an order of sequence numbers. Once journal data of the page 251 is reflected, a page 253 in the RCSVOL 266 is mapped to the page 252 of the entity in the pool 268B (S2212). In other words, the page 253 in the RCSVOL 266 is mapped to the page 252 of the entity of the page 251. When data is already stored in the page 253 in the RCSVOL 266, the storage apparatus 30B overwrites the page 252 of the entity.

When the storage apparatus 30B detects a marker in a journal retrieved from the journal volume 267B in this state, the storage apparatus 30B takes a snapshot (S1034). In this case, the storage apparatus 30B maps an address of the page 253 in the RCSVOL 266 to a page 255 in the SSVOL 271 corresponding to the page 253 in the RCSVOL 266 without storing entity data (S2214).

Figure 17:
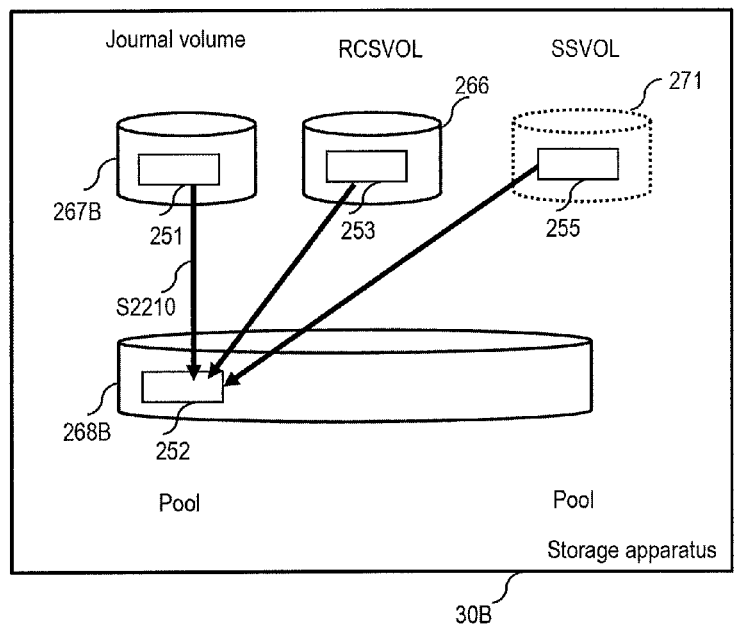
FIG. 17 shows a modification of a relationship between an RCSVOL and an SSVOL during snapshot creation.

FIG. 17 shows a modification of a relationship between data of an RCSVOL and data of an SSVOL during snapshot creation.

When a pool allocated to the RCSVOL 266 and a pool allocated to the SSVOL 271 are the same pool 268B, the page 252 in the pool 268B may be directly mapped to the page 255 in the SSVOL 271. The use of the same pool 268B by the RCSVOL 266 and the SSVOL 271 enables an operation cost of management of the pool 268B to be suppressed.

Figure 18:
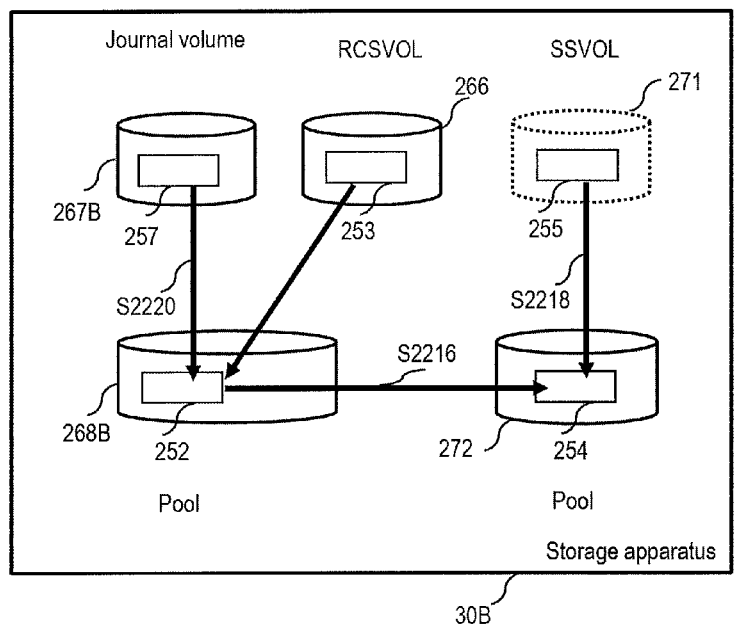
FIG. 18 shows a relationship between an RCSVOL and an SSVOL after snapshot creation.

FIG. 18 shows a relationship between an RCSVOL and an SSVOL after snapshot creation.

When journal data is reflected to the page 252 in the pool 268B by a journal indicating an update of the RCSVOL 266 after a snapshot is created, data of the page 252 in the pool 268B is transferred (saved), before the reflection, to a page 254 in a pool 272 for the SSVOL 271 (S2216), a mapping destination of the page 255 in the SSVOL 271 is changed to the page 254 in the pool 272 (S2218), and the page 252 in the pool 268B is updated with the journal data (S2220).

By transferring a difference of an asynchronous remote copy to the storage apparatus 30B and further combining a snapshot as described above, a high-speed full backup image can be created.

In this manner, in the reflection of the journal after the marker (snapshot creation) to the RCSVOL 266, the storage apparatus 30B writes data before the reflection into the page 254 in the pool 272 for the SSVOL 271 and writes data after the reflection into the page 252 in the pool 268B. Accordingly, the storage apparatus 30B is capable of writing only data prior to update of the RCPVOL 265 after the snapshot acquisition instruction into the pool 272. Alternatively, in the reflection of the journal after the marker to the RCSVOL 266, the storage apparatus 30B may keep the data before the reflection in the page 252 in the pool 268B and write data after the reflection into another page or another pool.

Moreover, when the SSVOL 271 is not managed as a volume as described earlier, a volume ID need not be assigned to the SSVOL 271. In this case, the storage apparatus 30B has a table that differs from the snapshot pair volume management information 351. This table need only manage at which address in an RCSVOL data having been backed up is stored.

As described above, by allocating the page 253 in the RCSVOL 266 or the page 252 in the pool 268B to the page 255 in the SSVOL 271, the storage apparatus 30B can create a snapshot of the RCSVOL 266 at high speed. When reflecting a journal after snapshot creation, by copying only data prior to the reflection to the pool 272, the data stored in the pool 272 is to be constituted only by a difference between the SSVOL 271 and the RCSVOL 266. Accordingly, usage amount of the pool 272 can be suppressed.

In addition, by using the pool 272 for a snapshot, management of the pool 268B, addition of the pool 272, and the like can be readily performed. By allocating the page 252 in the same pool 268B to the journal volume 267B and the RCSVOL 266, reflection of a journal from the RCPVOL 265 to the RCSVOL 266 and creation of a journal from the RCSVOL 266 to the RCPVOL 265 can be performed at high speed and, at the same time, usage amount of physical storage devices can be suppressed.

Hereinafter, restore (restoration) processes will be described.

Examples of restore methods include a first restore process to a third restore process described below.

Figure 19:
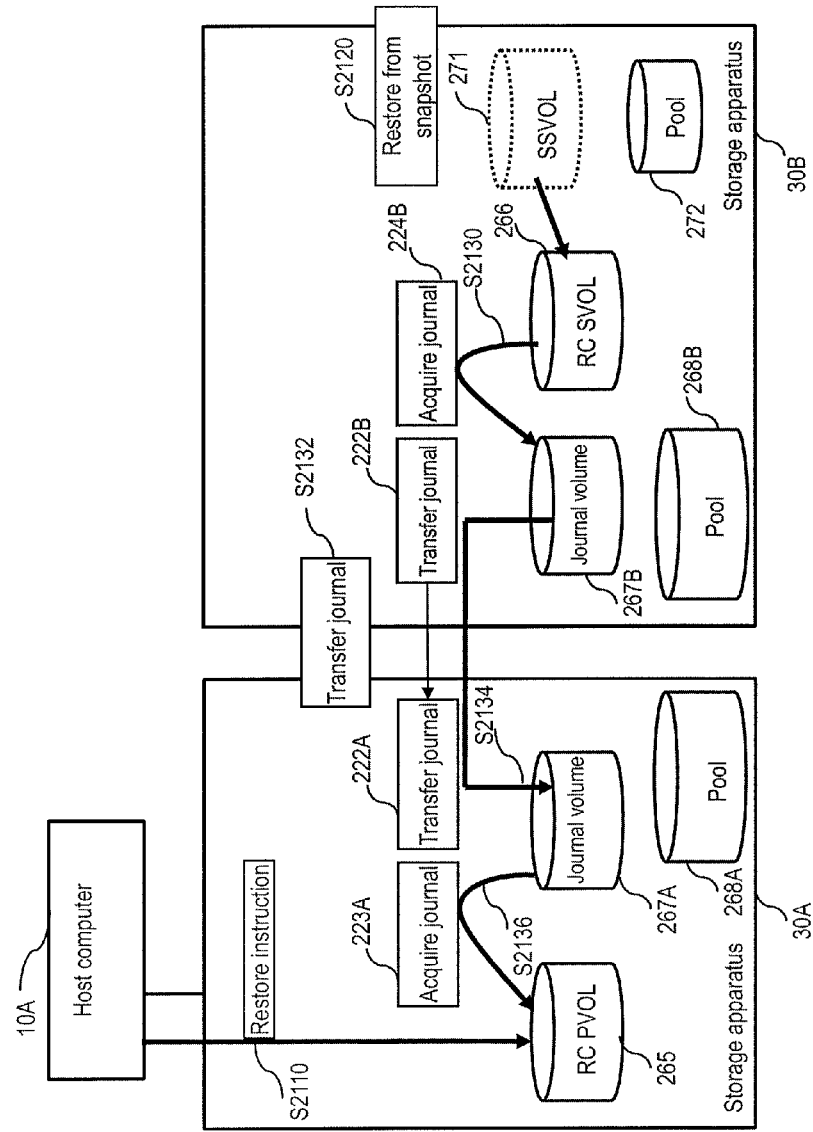
FIG. 19 shows an outline of a first restore process.

(1) First restore process: restore of a consistency group in which a difference of an asynchronous remote copy is transferred (2) Second restore process: volume restore by replication in which a snapshot volume is externally coupled (3) Third restore process: fine-grained restore by the host computer 10 in which a snapshot volume is externally coupled FIG. 19 shows an outline of the first restore process.

In the first restore process, an asynchronous remote copy from the storage apparatus 30B to the storage apparatus 30A is performed in an opposite direction to the journal processing described earlier. In the first restore process, a process of transferring a differential copy or, in other words, data of a location having been changed using a journal from the storage apparatus 30B to the storage apparatus 30A is performed.

The host computer 10 issues a restore instruction indicating a snapshot time point to be restored to the storage apparatus 30A (S2110). When starting the restore, the host computer 10 stops applications which access an RCPVOL (S2112). By performing a process of switching operations from the storage apparatus 30A to the storage apparatus 30B of the asynchronous remote copy, the host computer 10 switches between primary and secondary positions (S2114). After the switch, a direction of the copy process is changed to from the storage apparatus 30B to the storage apparatus 30A. The storage apparatus 30A notifies the storage apparatus 30B of this instruction.

The storage apparatus 30B restores data of the snapshot specified by the host computer 10 from the SSVOL to the RCSVOL (S2120).

Figure 20:
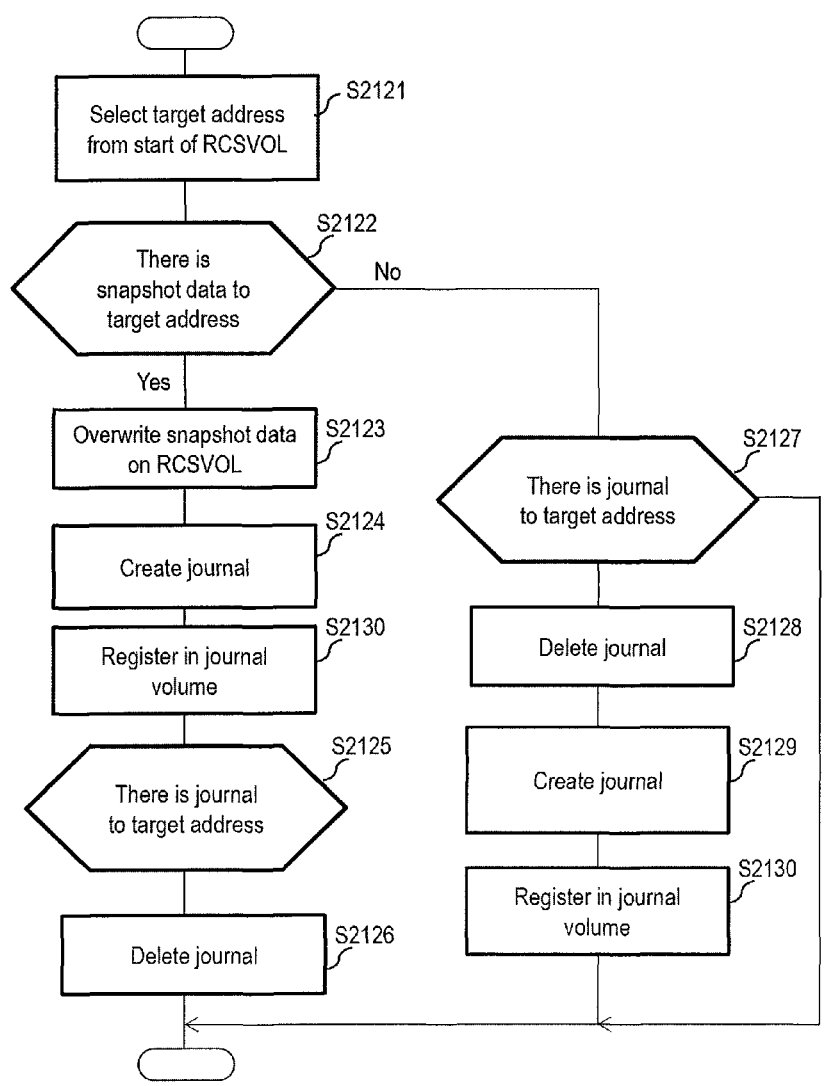
FIG. 20 shows details of an operation of a storage apparatus 30B in a first restore process.

FIG. 20 shows details of an operation of the storage apparatus 30B in the first restore process.

Specifically, the storage apparatus 30B selects a target address in data management units from a start address of an RCSVOL (S2121). Based on the snapshot pair volume management information 351, the storage apparatus 30B determines whether or not snapshot data corresponding to the target address exists in the pool 272 (S2122).

When snapshot data corresponding to the target address exists, since the snapshot data is data to be restored, the storage apparatus 30B overwrites the snapshot data onto data of the RCSVOL (S2123). In addition, the storage apparatus 30B creates a journal to be subjected to an asynchronous remote copy to the snapshot data (S2124) and registers the created journal in the journal volume 267B (S2130). The storage apparatus 30B determines whether or not a journal corresponding to the address described above exists in the journal volume 267B (S2125). When the journal exists, the storage apparatus 30B deletes the journal (S2126) and ends the present flow.

When the determination of S2122 reveals that snapshot data corresponding to the target address does not exist, data stored in the RCSVOL is data to be restored to the RCPVOL. Therefore, the storage apparatus 30B determines whether or not a journal corresponding to the address described above exists in the journal volume 267B (S2127). When the journal exists, the storage apparatus 30B deletes the journal (S2128). Subsequently, the storage apparatus 30B creates a journal with the data stored in the RCSVOL (S2129), registers the created journal in the journal volume 267B (S2130), and ends the present flow. When the journal does not exist, the storage apparatus 30B ends the present flow.

The storage apparatus 30B repeats this flow for each target address.

After executing the present flow with respect to all addresses in the RCSVOL, the storage apparatus 30B transfers the journal stored in the journal volume 267B to the storage apparatus 30A (S2132). The storage apparatus 30A stores the transferred journal in the journal volume 267A (S2134). Based on the journal, the storage apparatus 30A eliminates the difference in the asynchronous remote copy configuration and synchronizes the RCPVOL with the RCSVOL. In other words, by overwriting journal data at an address of the RCPVOL corresponding to the address indicated by the journal, the storage apparatus 30A restores data at the snapshot time point (S2136).

Once synchronization between the RCPVOL and the RCSVOL is attained, the host computer 10 starts up applications.

In the case of a management method of an SSVOL not in a volume format as described earlier, after restore of snapshot data (S2130), the storage apparatus 30B may perform a process of dividing the snapshot pair, assigning a volume ID to the SSVOL, and retaining the SSVOL in a volume format.

According to the first restore process described above, data of the RCPVOL 265 of the primary site 100A at a specific time point can be restored from the SSVOL 271 created at the secondary site 100B. In addition, by creating a journal of data prior to reflection by a journal after a marker in the SSVOL 271 (a difference between the SSVOL 271 and the RCSVOL 266) at the time point of a restore instruction or creating a journal of data prior to reflection of an unreflected journal in the RCSVOL 266 (a difference between the RCSVOL 266 and the RCPVOL 265), the storage apparatus 30B can perform restore at high speed without having to transfer all of the data in the SSVOL 271 to the storage apparatus 30A.

Figure 21:
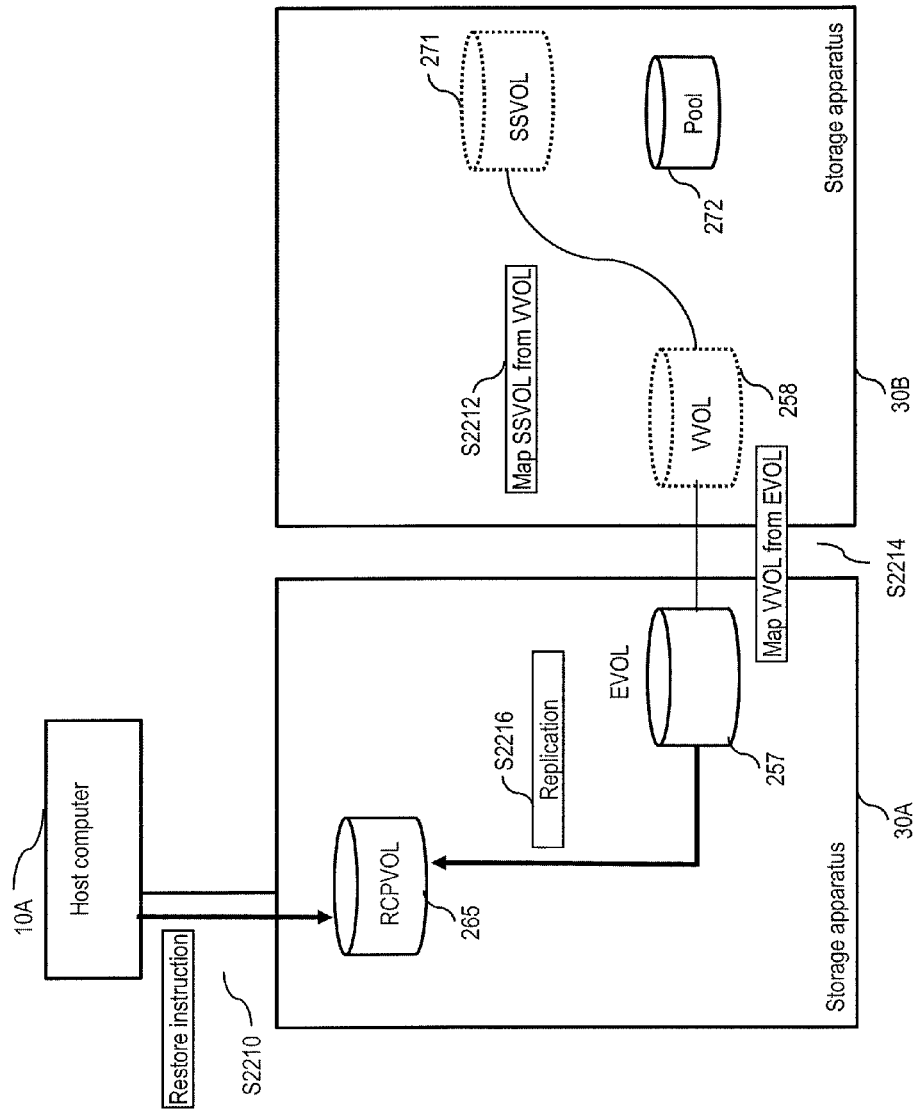
FIG. 21 shows a second restore process.

FIG. 21 shows the second restore process.

The second restore process includes a method of directly showing a snapshot itself to the host computer 10. A case where snapshot data is not managed in a volume format as described above will now be presented. When the storage apparatus 30A receives a restore instruction from the host computer 10 (S2210), the storage apparatus 30B provides a virtual volume (VVOL) 258 for managing snapshot data as a volume and maps an SSVOL 269 to the virtual volume 258 (S2212). Accordingly, the storage apparatus 30A can refer to the snapshot data using an address in the virtual volume 258.

The storage apparatus 30A makes the virtual volume 258 accessible using an external coupling function which makes a volume in an external storage apparatus accessible as an internal volume. The storage apparatus 30A provides an external volume (EVOL) 257 and maps the virtual volume 258 in the storage apparatus 30B to the external volume 257 (S2214). The storage apparatus 30A executes a replication process from the external volume 257 to the RCPVOL 265 and responds to the host computer 10 (S2216). In response to the response, the host computer 10 performs operations by accessing the RCPVOL 265. In the replication process, data in the external volume 257 is copied to the RCPVOL 265 even when the RCPVOL 265 is being accessed by the host computer 10. During the replication process, when the host computer 10 issues a read request with respect to the RCPVOL 265 but copying from the external volume 257 to a target page of the read request is not completed, the storage apparatus 30A copies data of the target page from the external volume 257 to the RCPVOL 265 and responds to the host computer 10 with the data.

Accordingly, the host computer 10 becomes capable of accessing, at high speed, snapshot data stored in the storage apparatus 30B that is not directly coupled to the host computer 10.

Next, the third restore process will be described.

In the third restore process, processing similar to the second restore process described above is performed up to S2214. Subsequently, the host computer 10 selects restore target data from the external volume 257 using an OS or an application and copies the selected data to the RCPVOL 265.

Accordingly, the host computer 10 can be provided with restore target data with finer granularity than a volume.

<Environment Construction>

An operation of performing preliminary environment construction is required by the storage system in order to perform the processing described above. A procedure of the preliminary environment construction will now be described.

After introducing devices, a system user (a manager) performs configuration of a network, configuration of the storage apparatuses 30, configuration of the host computer 10, and configuration of applications to run on the host computer 10. The configuration of the storage apparatus 30 involves creating a pool, creating a command device, configuring a port, and configuring a remote path and an external path (a path for coupling to an external storage apparatus). The configuration of the host computer 10 involves installing each component to the host computer 10, configuring a management program of a storage system, and documenting a backup configuration file. The management program operates copy-related programs stored in the storage apparatus 30 by issuing commands from the host computer 10 to the storage apparatus 30. The configuration of the management program involves creating a configuration file. The backup configuration file is stored in the host computer 10. For example, the backup configuration file defines a pool ID, port numbers of an RCPVOL and an RCSVOL, a capacity of a journal volume, a monitoring timeout value upon transition of a pair state, and the like. The values defined in this case are to be used during subsequent configuration operations.

Figure 22:
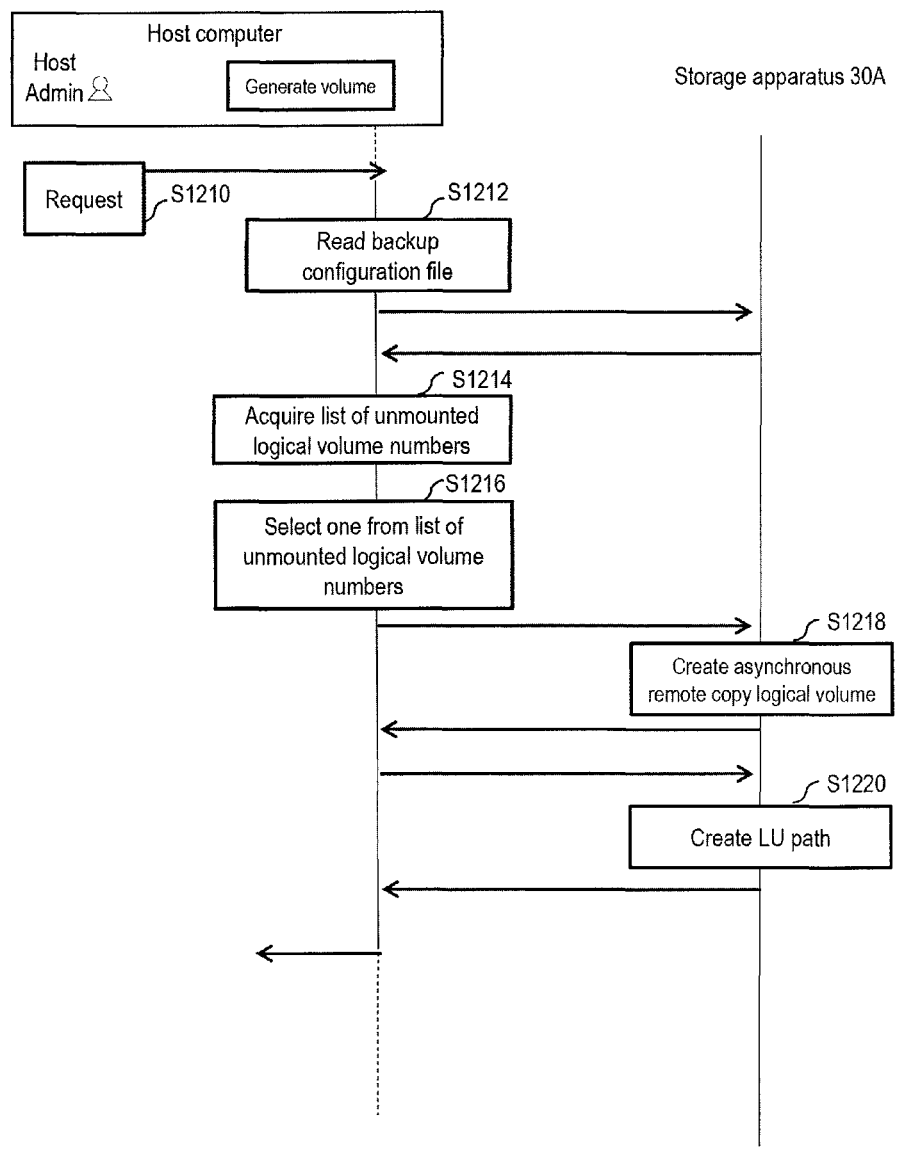
FIG. 22 shows an RCPVOL creation process.

FIG. 22 shows an RCPVOL creation process.

The storage apparatus 30A creates an RCPVOL in response to an instruction from the host computer 10.

The system user specifies a volume capacity and issues a volume creation instruction from the host computer 10 to the storage apparatus 30A (S1210). For example, the host computer 10 executes a volume creation script. The host computer 10 reads a backup configuration file and acquires a pool ID (S1212). In order to create a volume in the storage apparatus 30A, the host computer 10 acquires information on logical volume numbers of logical volumes yet to be created from the storage apparatus 30A (S1214). The host computer 10 selects one logical volume number from the acquired logical volume numbers (S1216). The host computer 10 issues an instruction for creating a logical volume of the selected number to the storage apparatus 30A, and the storage apparatus 30A creates the logical volume (S1218). At this point, the host computer 10 also transfers information on the acquired pool ID to the storage apparatus 30A. The capacity of the volume is set to a capacity specified by the system user, and a mark indicating that an attribute of the volume is to be an RCPVOL of an asynchronous remote copy volume is provided. The storage apparatus 30A creates an LU (Logical Unit) path in the created logical volume (S1220). The storage apparatus 30A stores information including a pool ID and a size at a location of the data volume management information 501 corresponding to the acquired logical volume number. Once the LU path is created, the storage apparatus 30A sends a reply to the host computer 10.

Once a volume is created, the volume attribute 530, the pool ID 524, and the size 536 are registered in the data volume management information 501 described above. When the volume is configured as a remote copy volume, the pair volume information 520 is registered. When a remote copy is further created, information thereof is registered in the remote copy pair volume management information 301.

Figure 23:
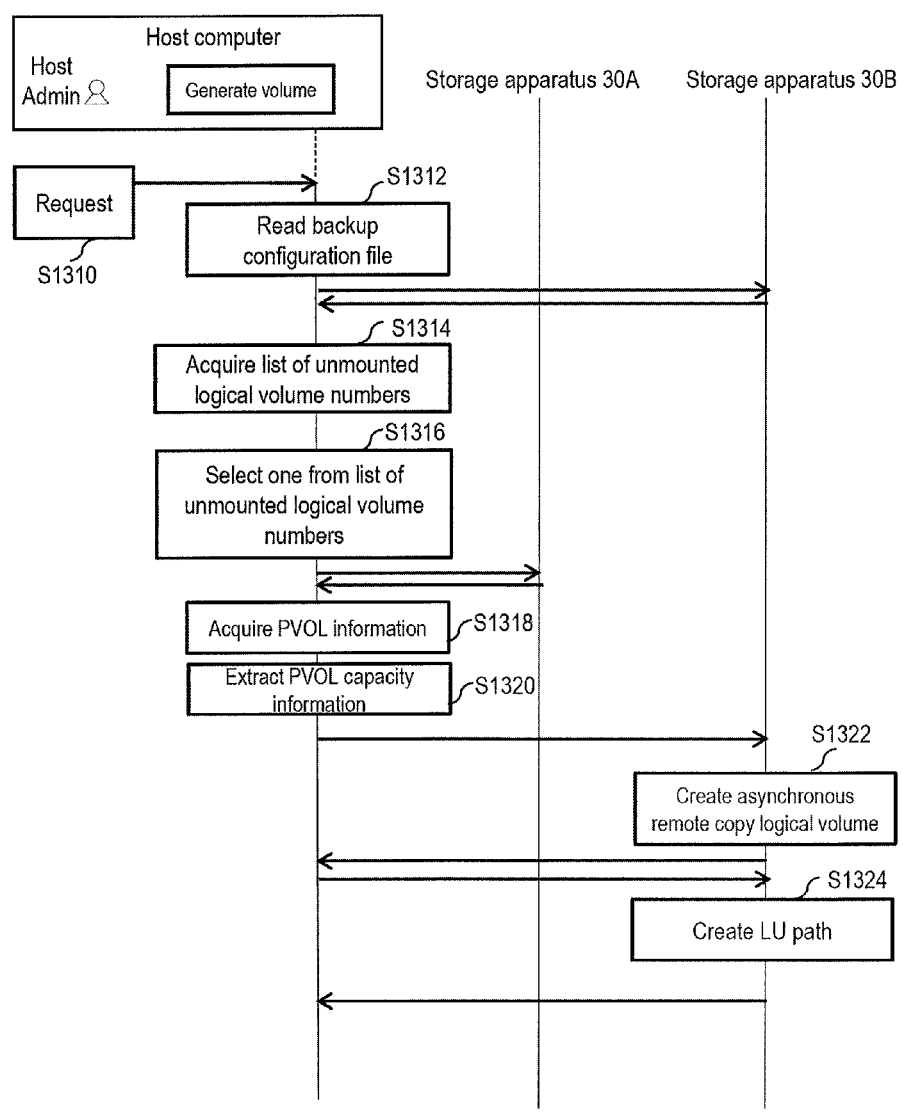
FIG. 23 shows an RCSVOL creation process.

FIG. 23 shows an RCSVOL creation process.

The storage apparatus 30B creates an RCSVOL in response to an instruction from the host computer 10.

The system user issues a consistency group creation instruction from the host computer 10 to the storage apparatus 30B (S1310). Specifically, the host computer 10 executes a consistency group creation script. A consistency group creation program of the host computer 10 reads a backup configuration file and acquires a pool ID (S1312).

In order to create a volume in the storage apparatus 30B, the host computer 10 acquires information on logical volume numbers for which logical volumes are yet to be created from the storage apparatus 30B (S1314). The host computer 10 selects one logical volume number from the acquired logical volume numbers (S1316). The host computer 10 specifies a volume number to be an RCPVOL to the storage apparatus 30A and acquires information on the RCPVOL (S1318). The host computer 10 extracts information such as a capacity of the RCPVOL from the acquired information (S1320). The host computer 10 specifies the extracted capacity and issues an instruction to create an RCSVOL to the storage apparatus 30B, and the storage apparatus 30B creates the RCSVOL (S1322). At this point, the host computer 10 also transfers information on the acquired pool ID. The capacity of the volume is set to a capacity specified by the system user, and a mark indicating that an attribute of the volume is to be an SVOL of an asynchronous remote copy volume is provided. The storage apparatus 30B creates an LU path in the created logical volume (S1324). Once the LU path is created, the storage apparatus 30B sends a reply to the host computer 10.

Second and subsequent RCSVOLs are created by repeating the processing of S1314 to S1324.

The storage apparatus 30B registers RCSVOL information in the data volume management information 501 in a similar manner to when RCPVOL information had been registered.

Figure 24:
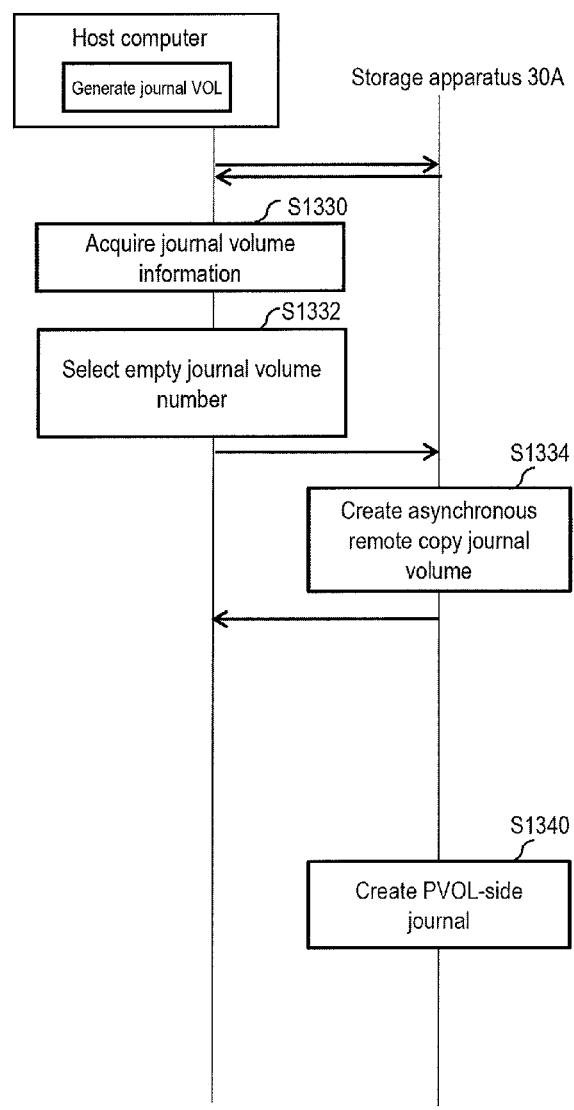
FIG. 24 shows an RCPVOL-side journal VOL creation process.

FIG. 24 shows an RCPVOL-side journal VOL creation process.

Since a journal VOL is a volume (an offline volume) which need not be recognized by the high-order host computer 10 that issues an access request, the journal VOL is managed by the journal volume management information 401. The host computer 10 acquires the journal volume management information 401 itself or information indicating that journal volumes are in use or are free (S1330), and selects one empty journal volume ID from the acquired information (S1332). The host computer 10 issues an instruction for creating an RCPVOL-side journal VOL to the storage apparatus 30A, and the storage apparatus 30A creates an RCPVOL-side journal VOL (S1334).

Subsequently, the storage apparatus 30A creates a journal of an RCPVOL in the RCPVOL-side journal VOL (S1340).

The storage apparatus 30A registers a volume ID and a pool ID with respect to the created journal volume in the journal volume management information 401. In addition, in a consistency group creation process to be described later, the storage apparatus 30A registers the volume ID of the journal volume in the consistency group management information 502 of a consistency group.

The host computer 10 and the storage apparatus 30B perform an RCSVOL-side journal VOL creation process in a similar manner to the RCPVOL-side journal VOL creation process.

The RCSVOL-side journal VOL creation process is a process in which the process performed on the storage apparatus 30A in the RCPVOL-side journal VOL creation process is performed on the storage apparatus 30B instead.

The storage apparatus 30 manages which RCPVOL or RCSVOL each journal VOL forms a set with.

Next, the consistency group creation process will be described.

The host computer 10 specifies a volume ID and a consistency group ID and issues an instruction to create a consistency group to the storage apparatuses 30A and 30B. Each of the storage apparatuses 30A and 30B registers, in the consistency group management information 502, the created RCPVOL and RCSVOL as information on an asynchronous remote copy pair to be grouped in a same consistency group. In addition, each of the storage apparatuses 30A and 30B registers a corresponding journal VOL in P journal volume information 570 and S journal volume information 580 in the consistency group management information 502. In the example of the consistency group management information 502 described above, the RCPVOL and the RCSVOL are described in pair volume management information 301 in the pair volume information 560.

Next, an asynchronous remote copy pair creation process will be described.

The host computer 10 issues an asynchronous remote copy pair creation instruction which specifies a volume number of an RCPVOL and a volume number of an RCSVOL to the storage apparatuses 30A and 30B. Accordingly, the storage apparatuses 30A and 30B create an asynchronous remote copy pair. The storage apparatuses 30A and 30B respectively register the specified RCPVOL and RCSVOL in the RCPVOL information 310 and the RCSVOL information 320 in the remote pair volume management information 301. The storage apparatuses 30A and 30B register an address of the remote pair volume management information 301 in pair volume management information # n in the consistency group management information 502.

Figure 25:
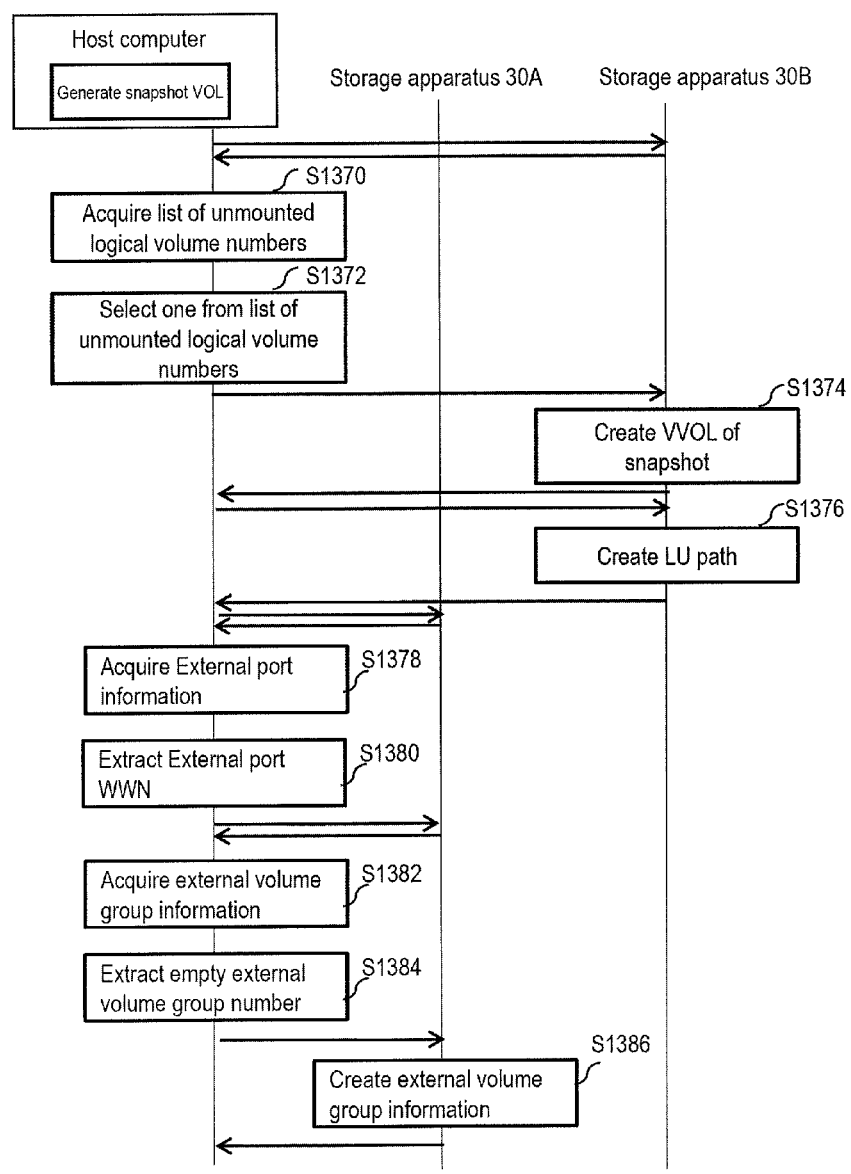
FIG. 25 shows a snapshot volume creation process.

FIG. 25 shows a snapshot volume creation process.

The host computer 10 and the storage apparatus 30B create a volume in a similar manner to S121 to S1220 in the volume creation process described earlier (S1370 to S1376). Since a copy source is an RCSVOL, the storage apparatus 30B creates a management information area to reserve the snapshot pair volume management information 351 for acquiring a snapshot of the RCSVOL (S1374).

When performing a restore from a backup volume (SSVOL), the host computer 10 creates an external volume for recognizing the backup volume in the storage apparatus 30A. As described earlier, an external volume is a method of virtualizing a logical volume inside an external storage as an internal volume of a host computer.

To this end, the host computer 10 acquires information on an External port from the storage apparatus 30A (S1378) and extracts a WWN of the External port from the acquired information (S1380). The host computer 10 acquires external volume group information indicating an external volume group from the storage apparatus 30A (S1382), and extracts an empty external volume number from the acquired information (S1384). The host computer 10 transmits information on a new external volume that specifies the extracted WWN and extracted empty external volume number to the storage apparatus 30A and creates external volume group information indicating the external volume (S1386).

Furthermore, in a similar manner to S121 to S1220 in the volume creation process described earlier, the host computer 10 and the storage apparatus 30A issue an instruction to create an external volume referring to an SSVOL to the storage apparatus 30A and the storage apparatus 30A creates an external volume.

Hereinafter, effects of the present embodiment will be described.

With the recent rapid increase in amounts of data in the era of big data, there are an increase in operation time required for backup, an increase in storage capacity for storing backup data, and an increase in operation and management costs for backup and restore.

With a conventional backup system, restoring all data in volume units is time-consuming. According to the present embodiment, the time required by the host computer 10 to access the RCPVOL 265 after a restore instruction is reduced.

With a conventional backup system, an increase in an amount of data to be a backup target causes a storage capacity reserved in order to store the data to continuously increase. According to the present embodiment, an amount of data to be stored in the storage apparatus 30B can be reduced and the storage capacity of the storage apparatus 30B can be reduced.

With a conventional backup system, a dedicated backup server for controlling a storage apparatus is required, for example, and a significant introduction cost is therefore incurred. In addition, since a backup operation requires configuration of a management program between the backup server and the storage apparatus and the like, a significant operational cost is incurred. The present embodiment eliminates the need to introduce a backup server.

Terms used in the expressions of the present invention will now be described. The first storage apparatus may be the storage apparatus 30A. The second storage apparatus may be the storage apparatus 30B. The first data volume may be the RCPVOL 265. The second data volume may be the RCSVOL 266. The first journal volume may be the journal volume 267A. The second journal volume may be the journal volume 267B. The snapshot may be the SSVOL 271. The specific condition may be the snapshot creation condition. The storage area in the second data volume may be the page 253 or the page 252. The virtual storage area in the snapshot may be the page 255. The first pool may be the pool 268B. The first storage area may be the page 252. The second storage area may be the page 254. The second pool may be the pool 272.

While an embodiment of the present invention has been described above, it is to be understood that the described embodiment merely represents an example for illustrating the present invention and that the scope of the present invention is not limited to the configuration described above. The present invention can also be implemented in various other modes.

REFERENCE SIGNS LIST 10, 10A Host computer
30, 30A, 30B Storage apparatus
31 Controller
32 Cache memory
33 Shared memory
34 Physical storage device
100A Primary site
100B Secondary site
108 Management network
121 Storage network
160 Network between storage apparatuses
171 Host adapter
172 Network adapter
175 Remote copy adapter
176 Processor
177 Storage adapter
178 Shared memory adapter

The invention claimed is:

1. A storage system, comprising:
a first storage apparatus coupled to a host computer; and
a second storage apparatus coupled to the first storage apparatus, wherein
the first storage apparatus is configured to create a first data volume and a first journal volume in the first storage apparatus,
the first storage apparatus is configured to provide the host computer with the first data volume,
the second storage apparatus is configured to create a second data volume and a second journal volume in the second storage apparatus,
the first storage apparatus is configured to create, in accordance with an update of the first data volume, at least one journal indicating the update in the first journal volume,
the first storage apparatus is configured to create, in the at least one journal in the first journal volume, a marker when a specific condition is satisfied,
the first storage apparatus and the second storage apparatus are configured to transfer the at least one journal in the first journal volume to the second storage apparatus,
the second storage apparatus is configured to write the at least one transferred journal into the second journal volume,
the second storage apparatus is configured to read the at least one journals in the second journal volume in order of the update,
the second storage apparatus is configured to reflect the at least one read journal to the second data volume,
the second storage apparatus is configured to create a snapshot of the second data volume upon detecting the marker in the at least one read journal,
the second storage apparatus is configured to create the snapshot by allocating a storage area in the second data volume to a virtual storage area in the snapshot,
the second storage apparatus is configured to create a first pool,
the second storage apparatus is configured to allocate a storage area in the first pool to a virtual storage area in the second data volume, the second storage apparatus is configured to read, from the second journal volume, a subsequent journal that is a journal created after the at least one journal including the marker, and when first data prior to reflection is stored in a first storage area that is a reflection destination of the subsequent journal in the second data volume, write the first data into a second storage area that differs from the first storage area, allocate the second storage area to a virtual storage area corresponding to the first storage area in the snapshot, and write second data included in the subsequent journal into the first storage area, the at least one journal includes journal data that is data written into the first data volume by the update, and journal metadata that indicates an order of the update and a storage area of the journal data, the second storage apparatus is configured to determine whether same data as journal data in the at least one transferred journal is stored in the second journal volume, the second storage apparatus is configured to, when it is determined that the same data is stored in the second journal volume, write journal metadata indicating the storage area of the same data into the second journal volume, and the second storage apparatus is configured to, when it is determined that the same data is not stored in the second journal volume, write the journal data in the at least one transferred journal into the second journal volume, and write the journal metadata indicating the storage area of the written journal data into the second journal volume.

2. The storage system according to claim 1, wherein the specific condition is one of the first storage apparatus receiving an instruction to create the snapshot, and a time point configured in advance being reached.

3. The storage system according to claim 2, wherein the second storage apparatus is configured to allocate a storage area in the first pool to a virtual storage area in the second journal volume.

4. The storage system according to claim 3, wherein the second storage apparatus is configured to create a second pool, the second storage apparatus is configured to select the first storage area from the first pool, and the second storage apparatus is configured to select the second storage area from the second pool.

5. The storage system according to claim 4, wherein the second storage apparatus is configured to, in response to a restore instruction, copy data prior to reflection of the subsequent journal in the snapshot to the second data volume, and create a journal indicating the copied data in the second journal volume, the second storage apparatus is configured to create, in the second journal volume, a journal indicating data prior to reflection of the journal transferred from the first storage apparatus in the second data volume, the first storage apparatus and the second storage apparatus are configured to transfer a journal in the second journal volume to the first storage apparatus, the first storage apparatus is configured to write the journal transferred from the second storage apparatus into the first journal volume, and the first storage apparatus is configured to reflect the journal in the first journal volume to the first data volume.

6. The storage system according to claim 4, wherein the second storage apparatus is configured to, in response to a restore instruction, create a first virtual volume, the second storage apparatus is configured to allocate a virtual storage area in the snapshot to a virtual storage area in the virtual volume, the first storage apparatus is configured to create a second virtual volume, the first storage apparatus is configured to allocate a virtual storage area in the first virtual volume to a virtual storage area in the second virtual volume, the first storage apparatus is configured to, by executing a replication from the second virtual volume to the first data volume, read data from the virtual storage area in the first virtual volume allocated to the virtual storage area in the second virtual volume, and copy the read data to the first data volume, and the first storage apparatus is configured to receive a read request with respect to the first data volume from the host computer during the replication and, when target data of the read request has not been copied from the second virtual volume to the first data volume, copy the target data from the second virtual volume to the first data volume.

7. The storage system according to claim 3, wherein the second storage apparatus is configured to select the first storage area and the second storage area from the first pool.

8. A control method of a storage system including a first storage apparatus coupled to a host computer, and a second storage apparatus coupled to the first storage apparatus, the control method comprising:

creating a first data volume and a first journal volume in the first storage apparatus;

providing the host computer with the first data volume;

creating a second data volume and a second journal volume in the second storage apparatus;

creating, in accordance with an update of the first data volume, at least one journal indicating the update in the first journal volume;

creating, in the at least one journal in the first journal volume, a marker when a specific condition is satisfied;

transferring the at least one journal in the first journal volume to the second storage apparatus;

writing the at least one transferred journal into the second journal volume;

reading the at least one journals in the second journal volume in order of the update;

reflecting the at least one read journals to the second data volume;

creating a snapshot of the second data volume upon detecting the marker in the at least one read journal;

creating the snapshot by allocating a storage area in the second data volume to a virtual storage area in the snapshot;

creating a first pool;

allocating a storage area in the first pool to a virtual storage area in the second data volume;

reading, from the second journal volume, a subsequent journal that is a journal created after the at least one journal including the marker, and when first data prior to reflection is stored in a first storage area that is a reflection destination of the subsequent journal in the second data volume, write the first data into a second storage area that differs from the first storage area, allocate the second storage area to a virtual storage area corresponding to the first storage area in the snapshot, and write second data included in the subsequent journal into the first storage area;

wherein the at least one journal includes journal data that is data written into the first data volume by the update, and journal metadata that indicates an order of the update and a storage area of the journal data;

determining whether same data as journal data in the at least one transferred journal is stored in the second journal volume;

when it is determined that the same data is stored in the second journal volume, write journal metadata indicating the storage area of the same data into the second journal volume, and when it is determined that the same data is not stored in the second journal volume, write the journal data in the at least one transferred journal into the second journal volume, and write the journal metadata indicating the storage area of the written journal data into the second journal volume.

* * * * *